(12) United States Patent
Wang

(10) Patent No.: US 11,634,542 B2
(45) Date of Patent: Apr. 25, 2023

(54) HIGH TEMPERATURE SEMICRYSTALLINE POLY(ARYL ETHER KETONE) COPOLYMERS

(71) Applicant: HT Materials Corporation, Clifton Park, NY (US)

(72) Inventor: YiFeng Wang, Clifton Park, NY (US)

(73) Assignee: HT MATERIALS CORPORATION, Clifton Park, NY (US)

( * ) Notice: Subject to any disclaimer, the term of this patent is extended or adjusted under 35 U.S.C. 154(b) by 231 days.

(21) Appl. No.: 17/191,486

(22) Filed: Mar. 3, 2021

(65) Prior Publication Data

US 2022/0002484 A1 Jan. 6, 2022

Related U.S. Application Data

(60) Provisional application No. 63/048,146, filed on Jul. 5, 2020.

(51) Int. Cl.
*C08G 65/40* (2006.01)
*C08K 3/26* (2006.01)
(Continued)

(52) U.S. Cl.
CPC .......... *C08G 65/4012* (2013.01); *C08K 3/042* (2017.05); *C08K 3/26* (2013.01);
(Continued)

(58) Field of Classification Search
CPC combination set(s) only.
See application file for complete search history.

(56) References Cited

U.S. PATENT DOCUMENTS

| 4,774,311 A | 9/1988 | Kelsey |
| 8,609,801 B2 * | 12/2013 | Hay .......................... C08G 8/02 528/128 |

(Continued)

FOREIGN PATENT DOCUMENTS

| CN | 1353125 A | 12/2002 |
| CN | 103450478 A | 12/2013 |

(Continued)

OTHER PUBLICATIONS

CN103509185A English Translation (Year: 2014).*

*Primary Examiner* — Ling Siu Choi
*Assistant Examiner* — Huihong Qiao
(74) *Attorney, Agent, or Firm* — Cantor Colburn LLP

(57) ABSTRACT

Compositions and methods for a semicrystalline poly(aryl ether ketone) copolymers incorporating 2-benzimidazolinone and 4,4'-biphenol as comonomer units with 4,4'-dihalobenzophenone, and compositions and methods for semicrystalline poly(aryl ether ketone) copolymers incorporating 2-benzimidazolinone and 4,4'-biphenol as comonomer units with 1,4-bis(4-dihalobenzoyl)benzene are described herein. The Copolymers have advantageous properties, particularly in terms of high glass transition temperatures ($T_g$), high melting temperatures ($T_m$), crystallinity and chemical resistance. The copolymers are suitable for manufacturing high temperature and chemical resistance molded systems and other articles of manufacture via injection molding, extrusion, compression molding, coating, and additive manufacturing.

12 Claims, 9 Drawing Sheets

(51) Int. Cl.
    *C08K 7/14*      (2006.01)
    *C08K 3/04*      (2006.01)
    *C08L 71/00*      (2006.01)
    *C08L 27/18*      (2006.01)
    *C08K 7/06*      (2006.01)

(52) U.S. Cl.
    CPC ................... *C08K 7/06* (2013.01); *C08K 7/14* (2013.01); *C08L 27/18* (2013.01); *C08L 71/00* (2013.01); *C08K 2003/262* (2013.01)

(56) References Cited

U.S. PATENT DOCUMENTS

| | | |
|---|---|---|
| 2006/0094852 A1 | 5/2006 | Yuan et al. |
| 2007/0197739 A1 | 8/2007 | Aneja et al. |
| 2009/0082538 A1 | 3/2009 | Wu |
| 2011/0218315 A1 | 9/2011 | Wu et al. |
| 2012/0095182 A1 | 4/2012 | Wu et al. |

FOREIGN PATENT DOCUMENTS

| | | | | |
|---|---|---|---|---|
| CN | 103509185 A | * | 1/2014 | ............. C08G 65/40 |
| CN | 103509185 A | | 1/2014 | |

* cited by examiner

HIGH TEMPERATURE SEMICRYSTALLINE POLY(ARYL ETHER KETONE) COPOLYMERS

CROSS-REFERENCE TO RELATED APPLICATIONS

The present application claims priority from U.S. Provisional Patent Application Ser. No. 63/048,146, filed on Jul. 5, 2020 which is incorporated by reference in its entirety as if fully set forth.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM

Not Applicable

STATEMENT REGARDING PRIOR DISCLOSURES BY THE INVENTOR OR A JOINT INVENTOR

Not Applicable

FIELD OF THE INVENTION

The present invention generally relates to semicrystalline poly(aryl ether ketone) copolymer compositions with improved heat resistance and chemical resistance, to a method of making the same, and to the use thereof in high pressure and high temperature environment such as oil and gas exploration and extraction.

BACKGROUND OF THE INVENTION

Poly(aryl ether ketone) polymers (PAEK), such as poly(ether ether ketone) polymers (PEEK), are known for their high temperature performance, excellent chemical resistance, inherent flame resistance, low smoke toxicity, high strength and low weight. PAEK has been widely used in various demanding applications in oil and gas production, components for aircraft and automotive, and medical devices. PEEK material is widely used as seals and backup rings for sealing applications as diverse as valves, pipelines, compressors, packers, manifolds and blowout preventers in oil and gas production. It is also used for electrical connectors, electrical insulation, fluid transport tubing, and compressor components. Due to its relatively low glass transition temperature of about 145° C. PEEK is somewhat limiting its ability to withstand continuous operations at temperatures of 150° C. or beyond.

Other PAEK polymers have been proposed with increased glass transition temperatures, such as polyetherketone (PEK) (Victrex™ PEEK-HT), poly(etherketoneketone) (Arkema Kepstan™ PEKK), and poly(etherketoneketone) (Victrex™ PEEK-ST). All these PAEKs, while possessing increased glass transition temperatures, their glass transition temperatures are between 150 to 165° C. and are somewhat limiting their ability to withstand continuous operations at temperatures of 170° C. or beyond. These PAEKs are also known as more sensitive to chemicals in aggressive environments, e.g., they possess lower steam resistance, and may suffer from excessively high melting temperatures, associated hence to processing hurdles.

As conventional sources of oil and gas decline, oil producers are increasingly turning their attention to unexplored or underdeveloped areas. Reservoirs with pressures and temperatures deemed higher than what was considered typical in the past are now frequent targets for exploration and development. The undisturbed bottom hole temperature (at prospective reservoir depth or total depth) is greater than 150° C. (typically 175° C.) and sometimes it can reach 200° C. with extreme temperature up to 300° C. The anticipated pore pressure of the porous formation to be drilled exceeds a hydrostatic gradient of 0.8 psi/ft, or the well requiring pressure control equipment has a rated working pressure in excess of 10,000 psi or 69 MPa with extreme pressure up to 150 MPa. The temperature and pressure affect the physical strength, electronic function and sealing technology. These temperatures and pressures are pushing workable limits of available PAEK polymers and their usage in downhole and fluid control component in high-temperature and high-pressure environment. This imposes very real limitations on much of the technology currently available to help developing these reservoirs.

In U.S. Pat. No. 8,609,801, Hay et al teach a new class of polymers and copolymers containing 2H-benzmidazol-2-one moieties. In particular, Hay et al disclose a PAEK copolymer with repeating unit of formula A having structure

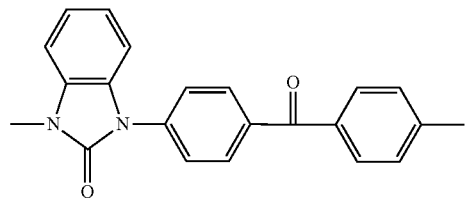

A and repeating unit of formula B having structure

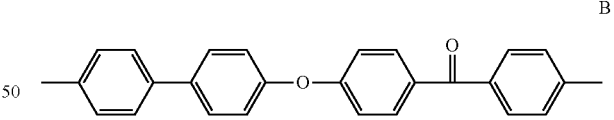

B wherein the molar ratios (A:B) of formula A and formula B are from 30:70 to 70:30.
When a molar ratio (A:B) of formula A and formula B is 70:30, a copolymer was reported to have a $T_g$ of 235° C. with no melting temperature or crystallization temperature, and when a molar ratio (A:B) of formula A and formula B is 30:70, a copolymer was reported to have a $T_g$ of 217° C. with no melting temperature or crystallization temperature, indicating that the copolymer is amorphous material. Although these copolymers could withstand continuous operations at temperatures up to 200° C., but they are amorphous and thus have poor resistance to organic solvents and liquids. Thus, they are not suitable for use in oil and gas applications.

There is hence a continuous quest in the art for poly(aryl ether ketone) (PAEK) polymers possessing an advantageous combination of improved thermal performances, chemical resistance, and ease of processability, while maintaining outstanding mechanical performances, so as to provide materials suitable for being used in a wide range of applications in oil and gas exploration and production.

Accordingly, a need exists for new semicrystalline PAEK polymers that can withstand continuous operations at high temperature and high pressure, and which retain their technical properties, notably their chemical resistance and mechanical properties (when compared with conventional PEEK polymer).

BRIEF SUMMARY OF THE INVENTION

The present invention provides for a semicrystalline poly (aryl ether ketone) copolymer that incorporates 2-benzimidazolinone and 4,4'-biphenol as comonomer units with 4,4'-dihalobenzophenone. The present invention also provides for another semicrystalline poly(aryl ether ketone) copolymer that incorporates 2-benzimidazolinone and 4,4'-biphenol as comonomer units with 1,4-bis(4-halobenzoyl) benzene. The semicrystalline PAEK copolymers containing 2-benzimidazolinone and 4,4'-biphenol comonomer units according to the current invention have advantageous properties, particularly in terms of their glass transition temperatures ($T_g$), crystallization temperatures from melt ($T_c$), melting temperatures ($T_m$), crystallinity and chemical resistance. These advantageous properties are unexpectedly achieved with addition of small amount (less than 30 mol %) of 2-benzimidazolinone as comonomer for copolymers from 4,4'-dihalobenzophenone, or less than 50 mol % of 2-benzimidazolinone as comonomer for copolymers from 1,4-bis (4-fluorobenzoyl)benzene, using a hydrophilic organic solvent N-Cyclohexyl-2-pyrrolidone (CHP) as polymerization solvent. The said semicrystalline PAEK copolymers are suitable for manufacturing high temperature and chemical resistance molded systems and other articles of manufacture via injection molding, extrusion, compression molding, coating and additive manufacturing.

Another embodiment of this invention produces semicrystalline copolymers of these instant chemical structures that exhibit thermal characteristics of a semicrystalline copolymer under the conditions subsequently defined herein.

DETAILED DESCRIPTION AND DEFINITION OF TERMS

Definition of Terms

Figure 1:
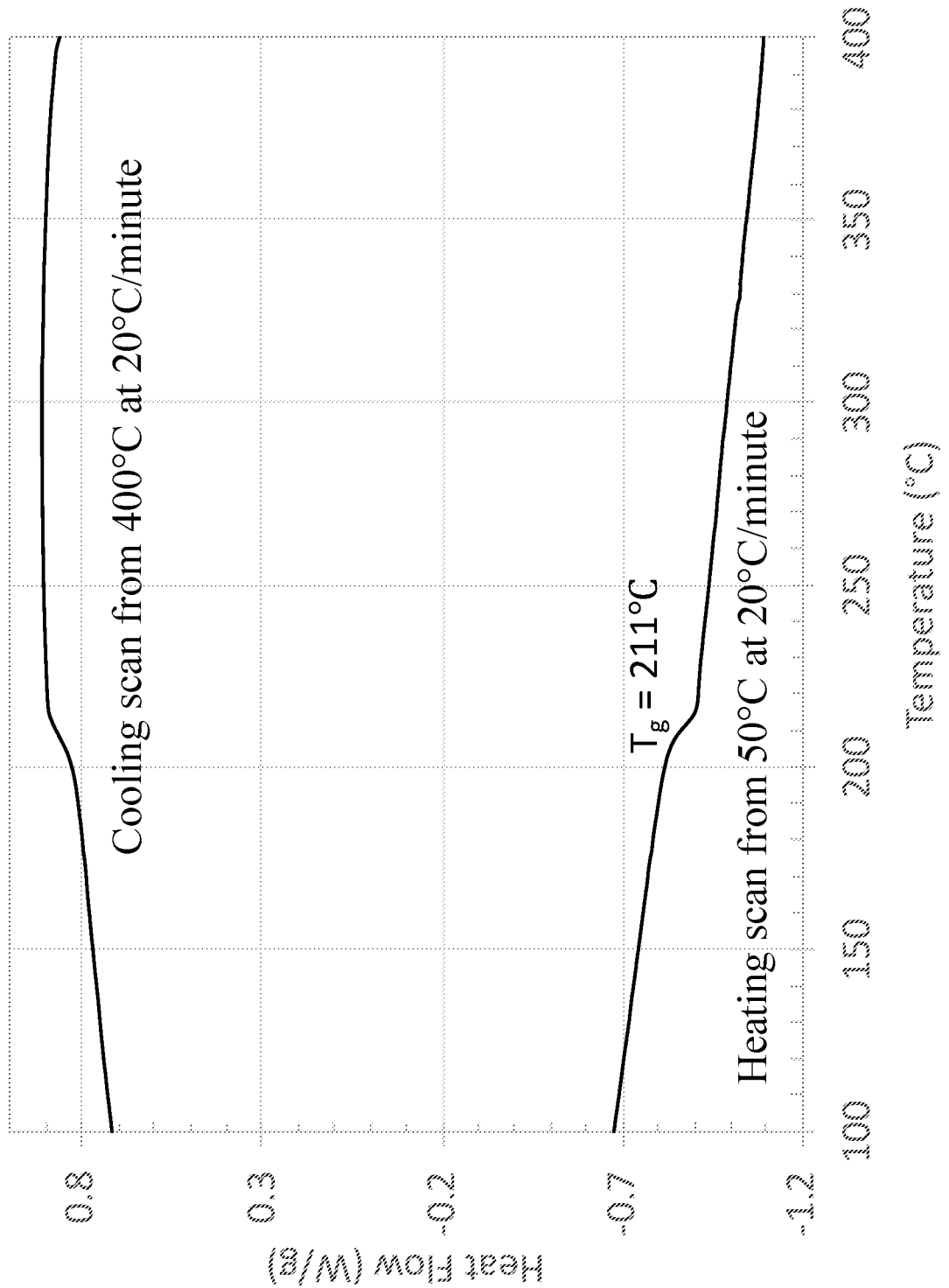
FIG. 1 is a graphical plot of DSC cooling scan (upper curve) at 20° C./minute and a heating scan (lower curve) at 20° C./minute for the PAEK copolymer of Comparative Example B. The cooling curve does not show crystallization exotherm peak. The heating curve only shows a glass transition.

As referred to in this application, the following definition and terms are used:

"DSC" means Differential Scanning Calorimetry (DSC) which is an analytical technique used to investigate the response of polymers to heating. DSC is used to study the glass transition, melting and crystallization of polymer.

"Copolymer" means polymer made from three or more monomers via polycondensation reaction, preferably made from bisphenol or bisphenol equivalent compounds with dihalo aromatic ketone compounds. The bisphenol or bisphenol equivalent compound is selected from 4,4'-biphenol and 2-benzimidazolinone, and the dihalo aromatic ketone compound is selected from 4,4'-dihalobenzophone and 1,4-bis(4-halobenzoyl)benzene.

"$T_g$" means glass transition temperature from second DSC heating scan at 20° C./minute after cooling from melt.

"$T_n$" means peak temperature at which crystallization exotherm is observed from second DSC heating scan at 20° C./minute after cooling from melt.

"$T_m$" means the peak temperature at which the melting endotherm is observed from second DSC heating scan at 20° C./minute after cooling from melt.

"$T_c$" means peak temperature at which crystallization exotherm is observed from first DSC cooling scan at 20° C./minute after melt.

"$\Delta H_a$" means enthalpy of crystallization exotherm observed from second DSC heating scan.

"ΔH$_m$" means enthalpy of melting endotherm observed from second DSC heating scan.

"ΔH$_c$" means enthalpy of crystallization endotherm observed from first DSC cooling scan.

"Semicrystalline" means a polymer of present invention with a detectable T$_c$ from first DSC cooling scan with a cooling rate at least at 5° C./minute but at less than 250° C./minute or a detectable T$_n$ from second DSC heating scan, and a ΔH$_m$ of at least 10 J/g but less than 55 J/g from second DSC heating scan. The cooling rate is preferably selected as 20° C./minute.

"Amorphous" means a polymer with no detectable T$_c$ from first DSC cooling scan with a cooling rate at least at 5° C./minute but at less than 250° C./minute from melt and no detectable T$_m$ from second DSC heating scan. The cooling rate is preferably selected as 20° C./minute.

"Crystalline" means a polymer of present invention with detectable T$_c$ from first DSC cooling scan with a cooling rate at least at 5° C./minute but at less than 250° C./minute from melt and a ΔH$_m$ of at least 55 J/g from second DSC heating scan. The cooling rate is preferably selected as 20° C./minute. The words repeating and recurring are used interchangeably herein.

DETAILED DESCRIPTION OF THE INVENTION

As described in the Background of the Invention, the existing PAEK polymers and technologies have limited usage in high temperature and high pressure environment due to their relatively low glass transition temperatures and/or poor chemical resistances, a need exists for new semicrystalline PAEK polymers that can withstand continuous operations at high temperature and high pressure, and which retain their technical properties, notably their chemical resistance and mechanical properties (when compared with conventional PEEK polymer).

A preferred embodiment of the present invention solves the problem.

A second embodiment of the present invention provides for a semicrystalline PAEK copolymer which has high T$_g$ (higher than 185° C.).

A third embodiment of the present invention provides for a semicrystalline PAEK copolymer which is melt processable and has a T$_m$ less than 400° C.

The preferred embodiments of the invention are useful in providing advantageous semicrystalline PAEK materials for use in high temperature and high pressure environment.

In one aspect of the invention, there is provided a semicrystalline PAEK copolymer having a recurring unit of formula, formula I

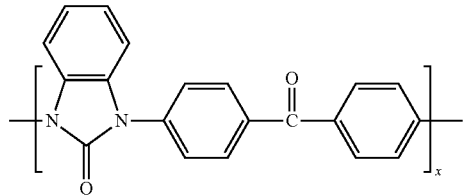

and a recurring unit of formula, formula II

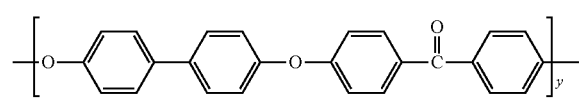

wherein the value of the subscript x ranges from 2 to 5000 and subject to the limitation that the value of the subscript y ranges from 2 to 5000, and the ratios (x:y) of recurring unit of formula I and recurring unit of formula II are in such a range (about 1:99 to about 29:71) that resulting semicrystalline copolymer has a glass transition temperature, a melting temperature and a crystallization temperature under cooling at cooling rate from 5° C./minute to about 250° C./minute (preferably at 20° C./minute) after melted at 420° C. In particular, the semicrystalline copolymer according to the current invention has a T$_g$ of greater than 185° C. with a melting temperature T$_m$ of about 340° C. to about 396° C., an enthalpy of melting endotherm ΔH$_m$ of about 10 J/g to 54 J/g, a crystallization temperature T$_c$ of less than 340° C. and an enthalpy of crystallization exotherm ΔH$_c$ of about 10 J/g to about 54 J/g with a cooling rate of 20° C./minute, or a crystallization temperature T$_n$ from heating of about 240° C. to about 300° C. and crystallization exotherm ΔH$_n$ of about 10 J/g to 54 J/g with a heating rate of 20° C./minute.

In another aspect of the invention, there is provided a PAEK copolymer having a recurring unit of formula, formula III

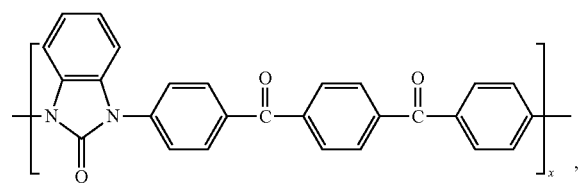

and a recurring unit of formula, formula IV

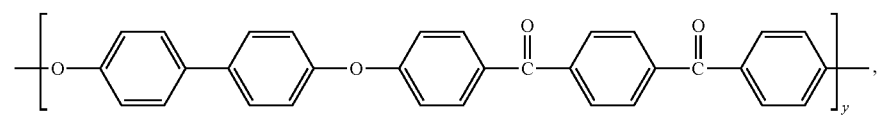

wherein x is from 2 to 5000, and y is from 2 to 5000, and the ratio of x:y ranges from 1:99 to 99:1.

In still another aspect of the invention, there is provided a semicrystalline PAEK copolymer wherein the ratios (x:y) of recurring units of formula III and recurring units of formula IV are in such a range (about 1:99 to about 45:55) that resulting semicrystalline copolymer has a glass transition temperature, a melting temperature and a crystallization temperature under cooling at cooling rate from 5° C./minute to 250° C./minute (preferably at 20° C./minute) after melted at 420° C.

In particular, the semicrystalline copolymer according to the current invention, wherein the ratio (x:y) of repeating unit of formula III and repeating unit of formula IV is from 1:99 to 45:55, has a $T_g$ of about 190° C. to about 230° C. with a melting temperature $T_m$ of about 330° C. to about 395° C., an enthalpy of melting endotherm $\Delta H_m$ of about 10 J/g to 54 J/g, a crystallization temperature from melt $T_c$ of about 250° C. to about 340° C. and an enthalpy of crystallization exotherm $\Delta H_c$ of about 10 J/g to about 54 J/g with a cooling rate of 20° C./minute.

The level and extent of crystallinity may be assessed by Differential Scanning Calorimetry (DSC) in a process such as the following which is also described in POLYMER Vol. 37 Number 20, 1996, page 4573.

DSC may be used to examine a 10±2 mg sample of PAEK copolymer in a TA Instruments DSC Q2000 under nitrogen at a flow rate of 40 ml/min. The scan procedure may be:
Step 1: Perform a preliminary thermal cycle by heating the sample from 50° C. to 420° C. at 20° C./minute
Step 2: Hold at 420° C. for 3 minutes
Step 3: Cool to 50° C. at 20° C./minute, record the $T_c$
Step 4: Heat from 50° C. to 420° C. at 20° C./minute, record $T_g$, $T_n$ (if any) and $T_m$
From the resulting second heating scan the onset of the $T_g$ may be obtained as the intersection of lines drawn along the pretransition baseline and a line drawn along the greatest slope obtained during the transition; The $T_m$ is temperature at which main peak of the melting endotherm reaches maximum. $T_c$ is the temperature at which the crystallization exotherm from melt reaches maximum. $T_n$ is the temperature at which the crystallization exotherm from heating reaches maximum.

The Heat of Crystallization $\Delta H_c$ (J/g) may be obtained from the first cooling scan by connecting the two points at which the crystallization exotherm deviates from the relatively straight baseline. The Heat of Crystallization $\Delta H_n$ (J/g) may be obtained from the second heating scan by connecting the two points at which the crystallization exotherm deviates from the relatively straight baseline. The integrated area under the exotherm as a function of time yields the enthalpy (mJ) of the transition, the mass normalized Heat of Crystallization is calculated by dividing the enthalpy by the mass of the specimen (J/g). The Heat of Fusion $\Delta H_m$ (J/g) may be obtained from the second heating scan by connecting the two points at which the melting endotherm deviates from the relatively straight baseline. The integrated area under the endotherm as a function of time yields the enthalpy (mJ) of the transition, the mass normalized Heat of Fusion is calculated by dividing the enthalpy by the mass of the specimen (J/g). The level of crystallization (%) is determined by dividing the Heat of Fusion of the specimen by the Heat of Fusion of a totally crystalline polymer, which for PEEK is 130 J/g.

The $T_m$ of said PAEK copolymer may be less than 400° C. but greater than 340° C., is suitably less than 390° C. but greater than 350° C., is preferably less than 380° C. but greater than 360° C. The $T_m$ is preferably in the range of 350° C. to 396° C.

The $T_g$ of said PAEK copolymer may be greater than 180° C. and is less than 230° C., preferably greater than 185° C. and less than 220° C. The $T_g$ is preferably in the range of 190° C. to 215° C.

The $T_m$ of said PAEK copolymer is greater than its $T_g$ by at least 140° C., preferably by at least 165° C., more preferably by at least 170° C. The $T_m$ is greater than the $T_g$ by less than 210° C. or less than 200° C. In a preferred embodiment, the $T_m$ is greater than the $T_g$ by about 145° C. to about 195° C.

In a preferred embodiment, said PAEK copolymer has a $T_g$ in the range of 185° C. to 210° C., a $T_m$ in the range of 355° C. to 385° C. and the $T_m$ is greater than the $T_g$ by about 160° C. to about 190° C.

Said PAEK copolymer may have a crystallinity, measured by DSC method as described above, of at least 7.5%, preferably at least 15%, more preferably at least 20%. The crystallinity may be less than 45% or less than 40%.

Said PAEK copolymer suitably has an inherent viscosity (IV) of about 0.3 to about 3.0 dL/g. The inherent viscosity of PAEK copolymer is suitably measured pursuant to ASTM D2857 standard at 30° C. on 0.5 wt/vol % solution in concentrated $H_2SO_4$ (96 wt %) and expressed in dL/g using a Cannon-Fenske capillary, size 200.

The PAEK copolymer comprising repeating units of formula I and repeating units of formula II should include no more than 29.0 mol %, preferably less than 28.0 mol %, more preferably less than 27.5 mol %, especially less than 25.0 mol % of repeating units of formula I. Said PAEK material may include 1.0 to 29.0 mol %, preferably 17.5 to 29.0 mol %, more preferably 22.0 to 28.0 mol % repeating units of formula I.

The PAEK copolymer comprising repeating units of formula I and repeating units of formula II should include at least 71.0 mol %, preferably at least 72.5 mol %, of repeating units of formula II. The PAEK material may include 71.0 to 99.0 mol %, preferably 72.5 to 85.0 mol %, more preferably 73.0 to 79.0 mol % of repeating units of formula II.

The ratio of repeating units of formula II and repeating units of formula I, defined as the mol % of repeating units of formula II divided by the mol % of repeating units of formula I, may be in the range of 2.45 to 99.00, is suitably in the range of 2.57 to 4.00 and is preferably in the range of 2.70 to 3.76.

In one aspect, said PAEK copolymer comprising repeating units of formula III and repeating units of formula IV may include 1 to 99 mol % repeating units of formula III.

In another aspect, the PAEK copolymer comprising repeating units of formula III and repeating units of formula IV should include no more than 45.0 mol %, preferably less than 40.0 mol %, more preferably less than 35.0 mol %, especially less than 30.0 mol % of repeating units of formula III. Said PAEK material may include 1.0 to 45.0 mol %, preferably 15.0 to 40.0 mol %, more preferably 25.0 to 35.0 mol % repeating units of formula III.

Said PAEK copolymer comprising repeating units of formula III and repeating units of formula IV may include at least 55.0 mol %, preferably at least 60.0 mol %, of repeating units of formula IV. Said PAEK material may include 55.0 to 99.0 mol %, preferably 60.0 to 80.0 mol %, more preferably 65.0 to 75.0 mol % of repeating units of formula IV.

The ratio of repeating units of formula IV and repeating units of formula III, defined as the mol % of repeating units of formula IV divided by the mol % of repeating units of formula III, may be in the range of 1.22 to 99.00, is suitably in the range of 1.50 to 4.00 and is preferably in the range of 1.86 to 3.00.

Said PAEK copolymer may be in monofilament form with a diameter in a range of 0.1 mm to 5.0 mm. The monofilament of the said PAEK material can be used in filament fusion fabrication 3D printing or other rapid prototyping method.

Said PAEK copolymer may be in powder form with particle size (D90) less than 200 μm. The powder of the said PAEK copolymer can be used in SLS 3D printing or other rapid prototyping method, in compression molding or in electrostatic or solvent-borne powder coating.

Said PAEK copolymer can be melt blended with one or more other polymers which include but not limited to polybenzimidazole, polyarylamides, polysulfones, polyketones, polyimides, polyetherimides, polyphenylenesulfides, fluoropolymers, polyamides, polyesters and polycarbonates.

Said PAEK copolymer may be part of a composition which may include said PAEK copolymer and a filler. Said filler may include both a fibrous filler and a non-fibrous filler.

A said fibrous filler may be continuous or discontinuous.

A said fibrous filler may be selected from inorganic fibrous materials, non-melting and high-melting organic fibrous materials, such as aramid fiber, and carbon fiber.

A said fibrous filler may be selected from glass fiber, carbon fiber, silica fiber, alumina fiber, zirconia fiber, boron nitride fiber, silicon nitride fiber, boron fiber, fluorocarbon resin fiber and potassium titanate fiber. Preferred fibrous fillers are glass fiber and carbon fiber.

A fibrous filler may comprise nanofibers.

A said non-fibrous filler may be selected from (i) colorants such as notably a dye, (ii) pigments such as notably titanium dioxide, zinc sulfide and zinc oxide, (iii) light stabilizers, e.g. UV stabilizers, (iv) heat stabilizers, (v) antioxidants such as notably organic phosphites and phosphonites, (vi) acid scavengers, (vii) processing aids, (viii) nucleating agents, (ix) internal lubricants and/or external lubricants, (x) flame retardants, (xi) smoke-suppressing agents, (xii) anti-static agents, (xiii) anti-blocking agents, (xiv) conductivity additives such as notably carbon black, graphite, graphene, metallic filler, and carbon nanofibrils, (xv) plasticizers, (xvi) flow modifiers, (xvii) extenders, (xviii) metal deactivators and combinations comprising one or more of the foregoing non-fibrous fillers.

The non-fibrous fillers may be introduced in the form of powder or flaky particles.

Said composition may define a composite material which could be prepared as described in Impregnation Techniques for Thermoplastic Matrix Composites. A Miller and A G Gibson, Polymer & Polymer Composites 4(7), 459-481 (1996), the contents of which are incorporated herein by reference. Preferably, in the method, said PAEK copolymer and said filler means are mixed at an elevated temperature of said PAEK copolymer. Thus suitably, said PAEK copolymer and filler means are mixed whilst the PAEK copolymer is molten. Said elevated temperature is suitably below the decomposition temperature of the PAEK copolymer. Said elevated temperature is preferably at or above the main peak of the melting endotherm ($T_m$) for said PAEK copolymer. Said elevated temperature is preferably at least 350° C. Advantageously, the molten PAEK copolymer can readily wet the filler and/or penetrate consolidated fillers, such as fibrous mats or woven fabrics, so the composite material prepared comprises the PAEK copolymer and filler means which is substantially uniformly dispersed throughout the PAEK copolymer.

The composite material may be prepared in a continuous process. In this case PAEK copolymer and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt comprising said PAEK copolymer. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass.

Alternatively, the composite material may be prepared in a discontinuous process. In this case, a predetermined amount of said PAEK copolymer and a predetermined amount of said filler may be selected and contacted and a composite material prepared by causing the PAEK copolymer to melt and causing the PAEK copolymer and filler to mix to form a substantially uniform composite material.

The composite material may be formed into a particulate form for example into pellets or granules. Pellets or granules may have a maximum dimension of less than 20 mm, preferably less than 7.5 mm, more preferably less than 5.0 mm.

Preferably, said filler means comprises one or more fillers selected from glass fiber, carbon fiber, carbon black and a fluorocarbon resin. More preferably, said filler means comprises glass fiber or carbon fiber.

A composition or composite material as described may include 10 to 95 wt % of said PAEK copolymer and 5 to 90 wt % of filler. Preferred embodiments include greater than 40 wt % of filler.

The said semicrystalline PAEK copolymer and/or composition, as above detailed, can be processed by usual melt processing techniques, including notably extrusion, injection molding, compression molding, thermoforming, coating and additive manufacturing, so as to provide shaped articles.

According to certain embodiments, shaped articles are under the form of substantially bidimensional articles, e.g., parts wherein one dimension (thickness or height) is significantly less than the other two characterizing dimensions (width and length), such as notably fibers, films and sheets.

According to other embodiments, shaped articles are provided as three-dimensional parts, e.g., substantially extending in the three dimensions of space in similar manner, including under the form of complex geometries parts, e.g., with concave or convex sections, possibly including undercuts, inserts, and the like.

Another object of the present invention is a method of making a semicrystalline PAEK copolymer, as above set forth, comprising reacting at least one dihalo-derivative of formula (V):

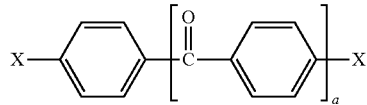

V with a mixture of compound of formula VI

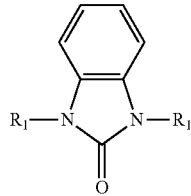

and compound of formula VII

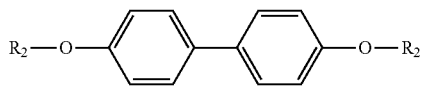

wherein a is 1 or 2, each X is selected from a chlorine and fluorine atom, R1 is selected from an alkali metal and a hydrogen atom and R2 is selected from an alkali metal and a hydrogen atom, in a molar ratio (VI:VII) of 29:71 to 1:99 when a in formula V is selected as 1, or in a molar ratio (VI:VII) of 1:99 to 99:1 when a in formula V is selected as 2, in a hydrophilic organic solvent N-cyclohexyl-2-pyrrolidone (CHP) in the presence of a alkali metal carbonate or a mixture of alkali metal carbonate.

Suitably, the number of moles of monomers which include chlorine or fluorine atoms which are polycondensed in the method are in slight molar excess over the number of moles of monomers which include alkali metal or hydrogen end groups.

The technical approach to polymerization of the said semicrystalline PAEK copolymer differs significantly from the art, including the U.S. Pat. No. 8,609,801 to Hay. In contrast to the art, the polymerization herein is carried out in a hydrophilic polar solvent that is liquid at room temperature, and the resulting polymers are semicrystalline. In addition, the present invention discloses polymerization reactions conducted at significantly lower temperatures, generally between about 200° C. and about 285° C. After polymerization, the said semicrystalline PAEK copolymer is isolated via one simple mixing with de-ionized water, and further purified with additional washing with de-ionized water to remove any residual inorganic salts. The hydrophilic polar solvent is easily recovered from the mixture with de-ionized water. In contrast, PAEK copolymers from 4,4'-biphenol in Hay's patent (U.S. Pat. No. 8,609,801) are processed at temperatures of 300° C. to 320° C. in an aprotic polar solvent that is solid at room temperature. The synthesis method in U.S. Pat. No. 8,609,801 requires tedious extraction with large amount of organic solvent such as acetone to isolate the polymer from diphenylsulfone, followed by tedious extraction with large amount of de-ionized water to remove inorganic salts in the polymer.

The said semicrystalline PAEK copolymer of the present invention can be prepared in solution by heating the monomers dissolved in hydrophilic organic solvent N-cyclohexyl-2-pyrrolidone (CHP) with anhydrous alkali metal carbonate or a mixture of alkali metal carbonates. The alkali metal carbonates are typically sodium carbonate, potassium carbonate or a mixture of sodium carbonate, potassium carbonate and cesium carbonate. The alkali metal carbonates can be anhydrous. Water formed during initial reaction can be removed, e.g., by dehydration via azeotropic distillation with organic solvent such as toluene or xylene or chlorobenzene, prior to reaching the polymerization temperature.

The total amount of alkali metal carbonate used can be such that there is at least 1 atom of alkali metal for each OH or NH group. An excess of alkali metal carbonate can be employed, and there may be 1.0 to 1.2 atoms of alkali metal per phenol OH or NH group.

In various embodiments of the present invention, the polymerization is carried out in hydrophilic organic solvent N-cyclohexyl-2-pyrrolidone (CHP) at or at below its boiling point (284° C.) under ambient pressure. In certain embodiments, the polymerization is carried out at temperatures from about 130° C. to about 284° C. In some embodiments, the polymerization temperature is from about 150° C. to about 280° C.

It is preferable that the monomers (V), (VI) and (VII) are heated, in the method of the invention, at a first temperature of at least 130° C., preferably at least 140° C., more preferably at least 150° C. in presence of $K_2CO_3$ and azeotropic solvent to form OK group and NK group. The reaction is generally pursued by heating the resulting mixture at a temperature of at about 160° C. to about 180° C. to dehydrate the reaction mixture with removal of water via azeotropic distillation. The dehydrated reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

It is also preferable that the monomers (VI) and (VII) are heated, in the method of the invention, at a first temperature of at least 130° C., preferably at least 140° C., more preferably at least 150° C. in presence of $K_2CO_3$ and azeotropic solvent to form OK group and NK group. The reaction is generally pursued by heating the resulting mixture at a temperature of at about 160° C. to about 180° C. to dehydrate the reaction mixture with removal of water via azeotropic distillation. Monomer (V) is then added to the dehydrated reaction mixture, and the reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

It is most preferable that the monomers (V) and (VI) are heated, in the method of the invention, at a first temperature of at least 130° C., preferably at least 140° C., more preferably at least 150° C. in presence of $K_2CO_3$ and azeotropic solvent to form NK group. The reaction is generally pursued by heating the resulting mixture at a temperature of at about 160° C. to about 180° C. to dehydrate the reaction mixture with removal of water via azeotropic distillation. The dehydrated reaction mixture is then heated to a temperature of preferably at least 190° C., preferably at least 200° C., and more preferably at least 220° C., at a temperature ramp rate of less than 10° C./minute. Once the final target temperature is attained, the reaction is generally continued for a limited time at this temperature. It was then cooled to temperature less than 170° C., and monomer (VII) was added along with azeotropic solvent.

The reaction mixture was then heated to at least 150° C. for a limited time to form phenoxide OK group. The reaction is generally pursued by heating the resulting mixture at a temperature of at about 160° C. to about 180° C. to dehydrate the reaction mixture with removal of water via azeotropic distillation. The dehydrated reaction mixture is then heated to a temperature of preferably at least 190° C., preferably at least 230° C., and more preferably at least 260° C., at a temperature ramp rate of less than 20° C./minute, preferably less than 10° C./minute and/or at a temperature ramp rate of less than 5° C./minute. Once the final target temperature is attained, the reaction is generally continued for a limited time at this temperature, before being terminated.

EXAMPLES

The following examples are illustrative of the practice of the present invention and are not intended in any way to limit their scope.

Copolymers from 4,4'-biphenol and 2-benzimidazolinone with 4,4'-difluorobenzophenone

Comparative Example A: Preparation of PAEK Copolymer-A 50/50

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 3.50 g (18.80 mmol) of 4,4'-biphenol, 2.52 g (18.80 mmol) of 2-benzimidazolinone, 5.72 g (41.35 mmol) of anhydrous potassium carbonate, 8.28 g (37.97 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 90 minutes. During this process xylene along with water were distilled and collected in Dean-Stark trap and removed. The reaction mixture was then heated to 195° C. in 10 minutes and kept at 195° C. for 30 minutes. During this process residual xylene along with trace amount of water were distilled and collected in Dean-Stark trap. The reaction mixture was then heated from 195° C. to 240° C. in 30 minutes. During this process the reaction turned into low viscosity mixture in light yellow color. The polymerization was kept at 240° C. for 2 hours. During the first hour reaction, the reaction mixture remained as low viscosity mixture in light yellow color, and after 2 hours reaction, it turned into viscous liquid. The reaction mixture was then heated from 240° C. to 260° C. in 15 minutes and kept at 260° C. for 2 hours. The reaction mixture became highly viscous solution after 2 hours reaction. At end of 2 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 12.5 g powder. The structure of the obtained copolymer can be sketched, in terms of repeating units, as follows:

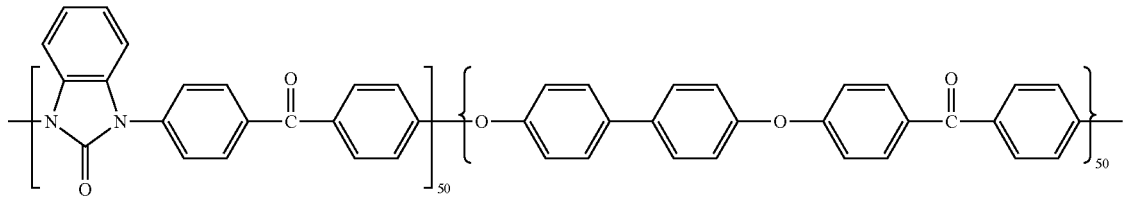

The inherent viscosity of the copolymer, measured at 0.5 wt/vol % in 96% $H_2SO_4$ at 30° C., as above detailed, was found to be 0.85 dL/g, DSC analysis from first cooling scan from 420° C. to 50° C. at 20° C./minute did not show a crystallization temperature, second heating scan from 50° C. to 420° C. showed a $T_g$ of 232° C., there was no detectable melting temperature between 230 to 420° C.

Comparative Example B: Preparation of PAEK Copolymer-B 35/65

In a 250 mL 3-neck reaction flask equipped with a mechanical stirrer, an argon inlet tube, a thermocouple plunging in the reaction medium, and a Dean-Stark trap with a condenser, were introduced 45.0 g of N-cyclohexyl-2-pyrrolidone (CHP), 4.00 g (21.48 mmol) of 4,4'-biphenol, 1.55 g (11.57 mmol) of 2-benzimidazolinone, 5.02 g (36.35 mmol) of anhydrous potassium carbonate, 7.28 g (33.38 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 90 minutes. During this process xylene along with water were distilled and collected in Dean-Stark trap and removed. The reaction mixture was then heated to 195° C. in 10 minutes and kept at 195° C. for 30 minutes. During this process residual xylene along with trace amount of water were distilled and collected in Dean-Stark trap. The reaction mixture was then heated from 195° C. to 240° C. in 30 minutes. During this process the reaction turned into low viscosity mixture in light yellow color. The polymerization was kept at 240° C. for 2 hours. The reaction mixture became viscous after 1 hour reaction and highly viscous after 2 hours reaction. The reaction mixture was then heated from 240° C. to 260° C. in 15 minutes, during this process the viscosity of reaction mixture decreased. The reaction was kept at 260° C. for 2 hours and the reaction mixture became highly viscous solution after 2 hours reaction. At end of 2 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 11.1 g powder. The structure of the obtained copolymer can be sketched, in terms of repeating units, as follows:

carbonate, 7.95 g (36.42 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept 175° C. for 60 minutes. During this process xylene along with water were distilled and collected in Dean-Stark trap and removed. The reaction mixture was then heated to 210° C. in 20 minutes and kept at 210° C. for 2 hours. During this process the reaction mixture remained as low viscosity liquid. At end of 2 hours reaction, the reaction mixture was cooled to 155° C. and 4.77 g (25.60 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 2 hours. The reaction mixture became viscous after 1 hour reaction and highly viscous after 2 hours reaction. The reaction mixture was then heated from 240° C. to 260° C. in 15 minutes, during this process the viscosity of reaction mixture decreased. The reaction was kept at 260° C. for 4 hours and the reaction mixture became highly viscous solution after 2 hours reaction. At end of 4 hours reaction, the viscous reaction mixture was cooled to less than 100° C. under stirring. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and

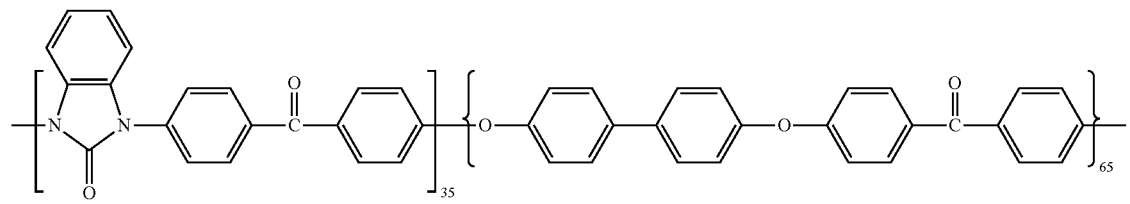

The inherent viscosity of the copolymer, measured at 0.5 wt/vol % in 96% $H_2SO_4$ at 30° C., as above detailed, was found to be 0.90 dL/g. DSC analysis (FIG. 1) from first cooling scan from 420° C. to 50° C. at 20° C./minute did not show a crystallization temperature, second heating scan from 50° C. to 420° C. showed a $T_g$ of 211° C., there was no detectable melting temperature between 200 to 420° C.

Example 1: Preparation of PAEK-1 Copolymer 29/71

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 1.40 g (10.46 mmol) of 2-benzimidazolinone, 5.48 g (39.66 mmol) of anhydrous potassium filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 12.3 g powder. The structure of the obtained copolymer can be sketched, in terms of repeating units, as follows:

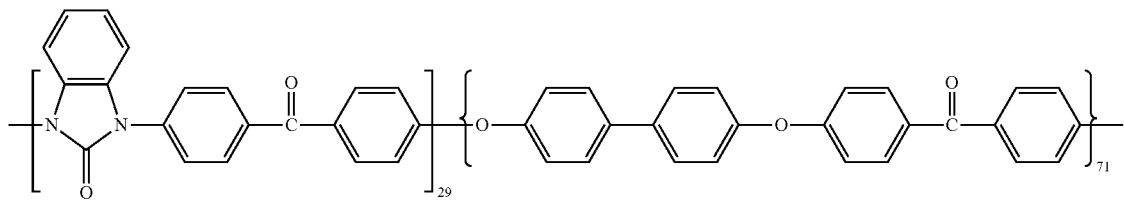

The inherent viscosity of the copolymer, measured at 0.5 wt/vol % in 96% $H_2SO_4$ at 30° C., as above detailed, was found to be 0.95 dL/g. DSC analysis from first cooling scan from 420° C. to 50° C. at 20° C./minute did not show a crystallization temperature, but second heating scan from 50° C. to 420° C. showed a $T_g$ of 199° C., a crystallization temperature ($T_n$) of 284° C. with a enthalpy of crystallization exotherm of 17.9 J/g, and a melting temperature of 366° C. with a enthalpy of melting endotherm of 16.5 J/g, indicating that this copolymer is semicrystalline with 12.7% crystallinity.

Example 2: Preparation of PAEK-2 Copolymer 25.0/75.0

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 1.13 g (8.41 mmol) of 2-benzimidazolinone, 5.12 g (37.02 mmol) of anhydrous potassium carbonate, 7.42 g (33.99 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 20 minutes and kept at 210° C. for 1 hour. During this process the reaction mixture remained as low viscosity liquid. At end of 1 hour reaction, the reaction mixture was cooled to 155° C. and 4.70 g (25.24 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 1 hour. The reaction mixture became highly viscous after 1 hour reaction. The reaction mixture was then heated from 240° C. to 260° C. in 15 minutes, during this process the viscosity of reaction mixture decreased. The reaction mixture became highly viscous after 20 minutes at 260° C. The reaction was continued for 2 hours at 260° C. At end of 2 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 11.3 g powder. The structure of the obtained copolymer can be sketched, in terms of repeating units, as follows:

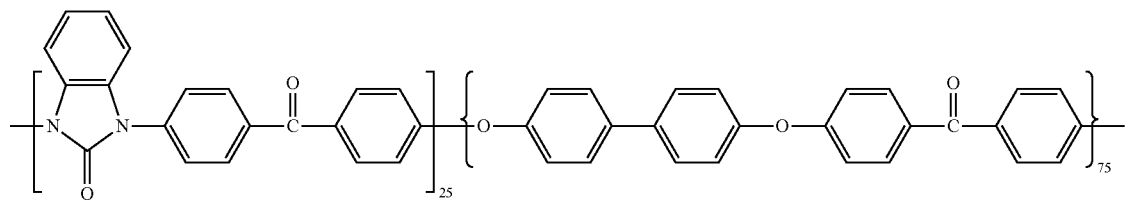

Figure 2:
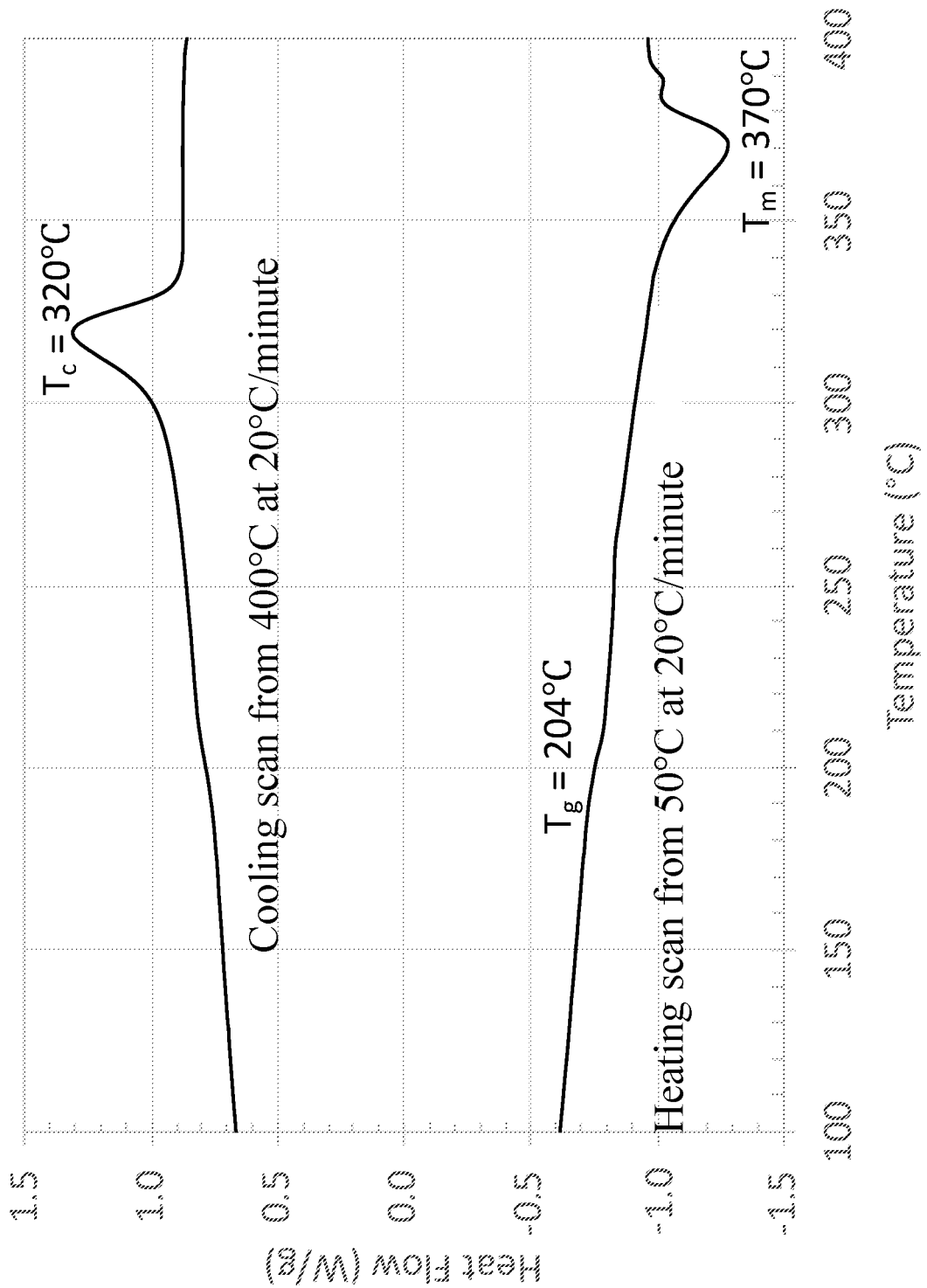
FIG. 2 is a graphical plot of DSC cooling scan (upper curve) at 20° C./minute and a heating scan (lower curve) at 20° C./minute for the PAEK copolymer of Example 2. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.85 dL/g. DSC analysis (FIG. 2) from first cooling scan from 420° C. to 50° C. at 20° C./minute showed a crystallization temperature of 320° C. with enthalpy of crystallization exotherm of 30.0 J/g, second heating scan from 50° C. to 420° C. showed a $T_g$ of 204° C., a melting temperature of 370° C. with a enthalpy of melting endotherm of 31.0 J/g, indicating that this copolymer is semicrystalline with 23.8% crystallinity.

Example 3: Preparation of PAEK-3 Copolymer 23/77

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 1.01 g (7.54 mmol) of 2-benzimidazolinone, 4.98 g (36.06 mmol) of anhydrous potassium carbonate, 7.22 g (33.11 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 20 minutes and kept at 210° C. for 1 hour. During this process the reaction mixture remained as low viscosity liquid. At end of 1 hour reaction, the reaction mixture was cooled to 155° C. and 4.70 g (25.24 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 2 hours. The reaction mixture became highly viscous after 2 hours reaction. The reaction mixture was then heated from 240° C. to 260° C. in 15 minutes, during this process the viscosity of reaction mixture decreased. The reaction mixture became viscous after 1 hour reaction at 260° C. The reaction was continued for 5 hours at 260° C. At end of 5 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Figure 3:
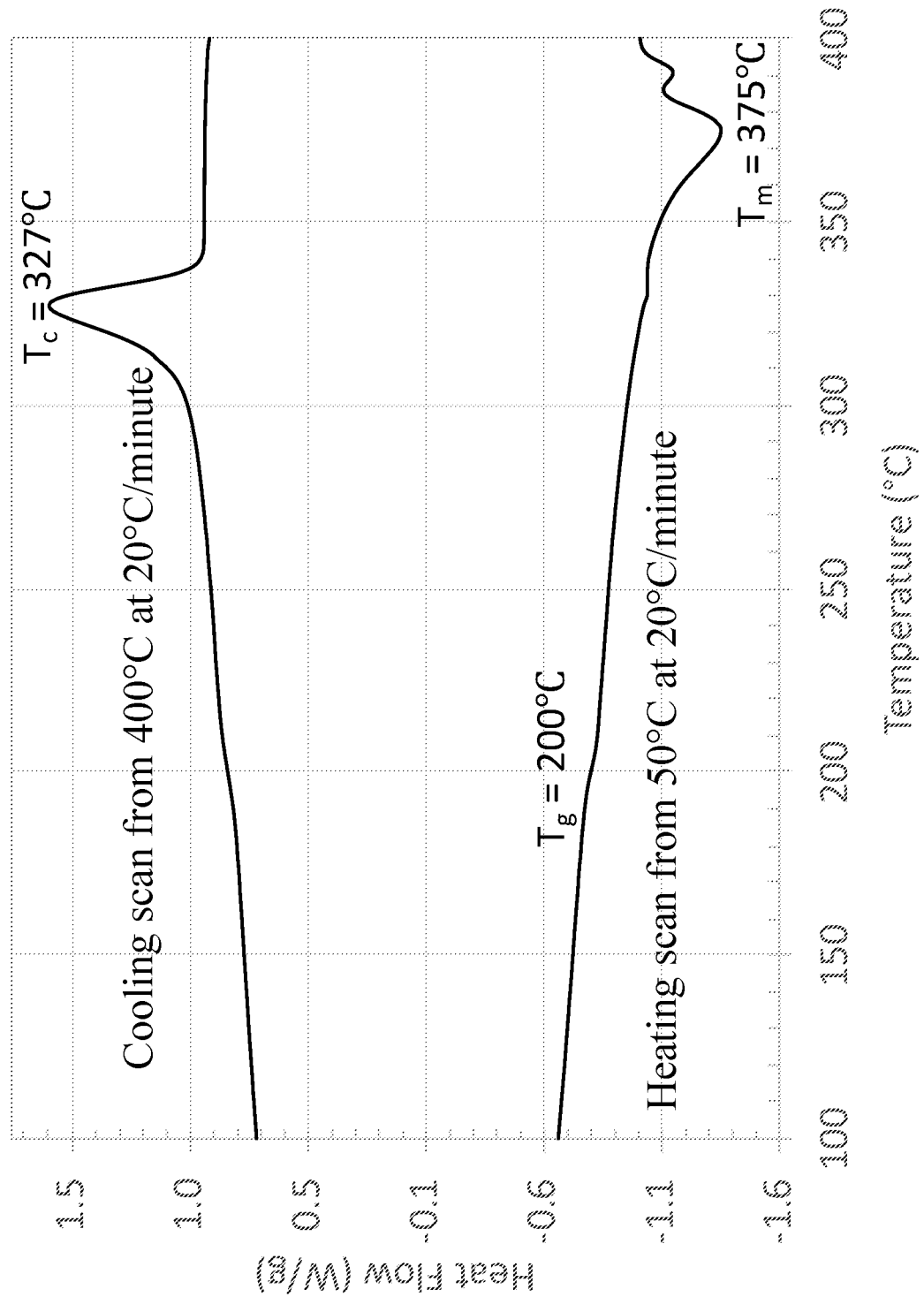
FIG. 3 is a graphical plot of DSC cooling scan (upper curve) at 20° C./minute and a heating scan (lower) curve at 20° C./minute for the PAEK copolymer of Example 3. The cooling curve shows a strong crystallization exotherm peak. The heating curve shows a glass transition and a strong melting endotherm peak.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.2 g powder. The structure of the obtained copolymer can be sketched, in terms of repeating units, as follows:

The inherent viscosity of the copolymer, measured at 0.5 wt/vol % in 96% $H_2SO_4$ at 30° C., as above detailed, was found to be 0.80 dL/g. DSC analysis (FIG. 3) from first cooling scan from 420° C. to 50° C. at 20° C./minute showed a crystallization temperature of 327° C. with enthalpy of crystallization exotherm of 35.9 J/g, second heating scan from 50° C. to 420° C. showed a $T_g$ of 200° C., a melting temperature of 375° C. with a enthalpy of melting endotherm of 25.7 J/g, indicating that this copolymer is semicrystalline with 19.8% crystallinity.

Example 4: Preparation of PAEK-4 Copolymer 20/80

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 0.85 g (6.31 mmol) of 2-benzimidazolinone, 4.80 g (34.70 mmol) of anhydrous potassium carbonate, 6.95 g (31.87 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 20 minutes and kept at 210° C. for 1 hour. During this process the reaction mixture remained as low viscosity liquid. At end of 1 hour reaction, the reaction mixture was cooled to 155° C. and 4.70 g (25.24 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 1 hour. The reaction mixture remained as low viscosity slurry during 1 hour reaction. The reaction mixture was then heated from 240° C. to 260° C. in 15 minutes and kept at 260° C. for 1 hour. During the 1 hour reaction, the reaction mixture remained as low viscosity slurry. The reaction mixture was then heated to 270° C. in 5 minutes and kept at 270° C. for 4 hours. During this process, the reaction mixture became viscous. At end of 4 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a

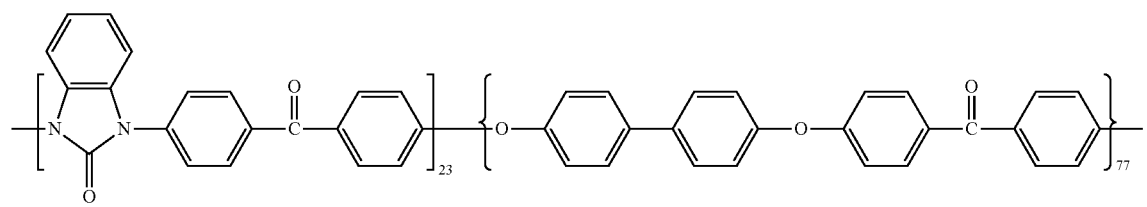

Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.7 g powder. The structure of the obtained copolymer can be sketched, in terms of repeating units, as follows:

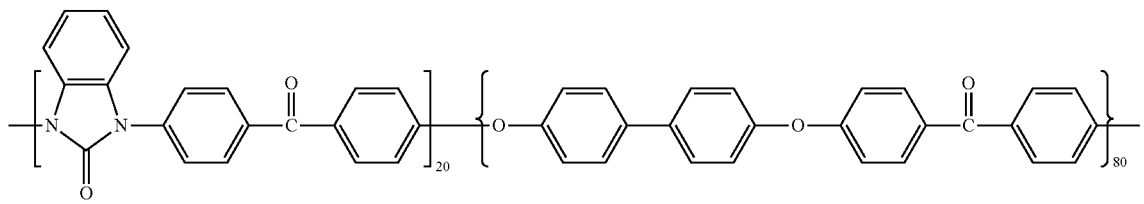

Figure 4:
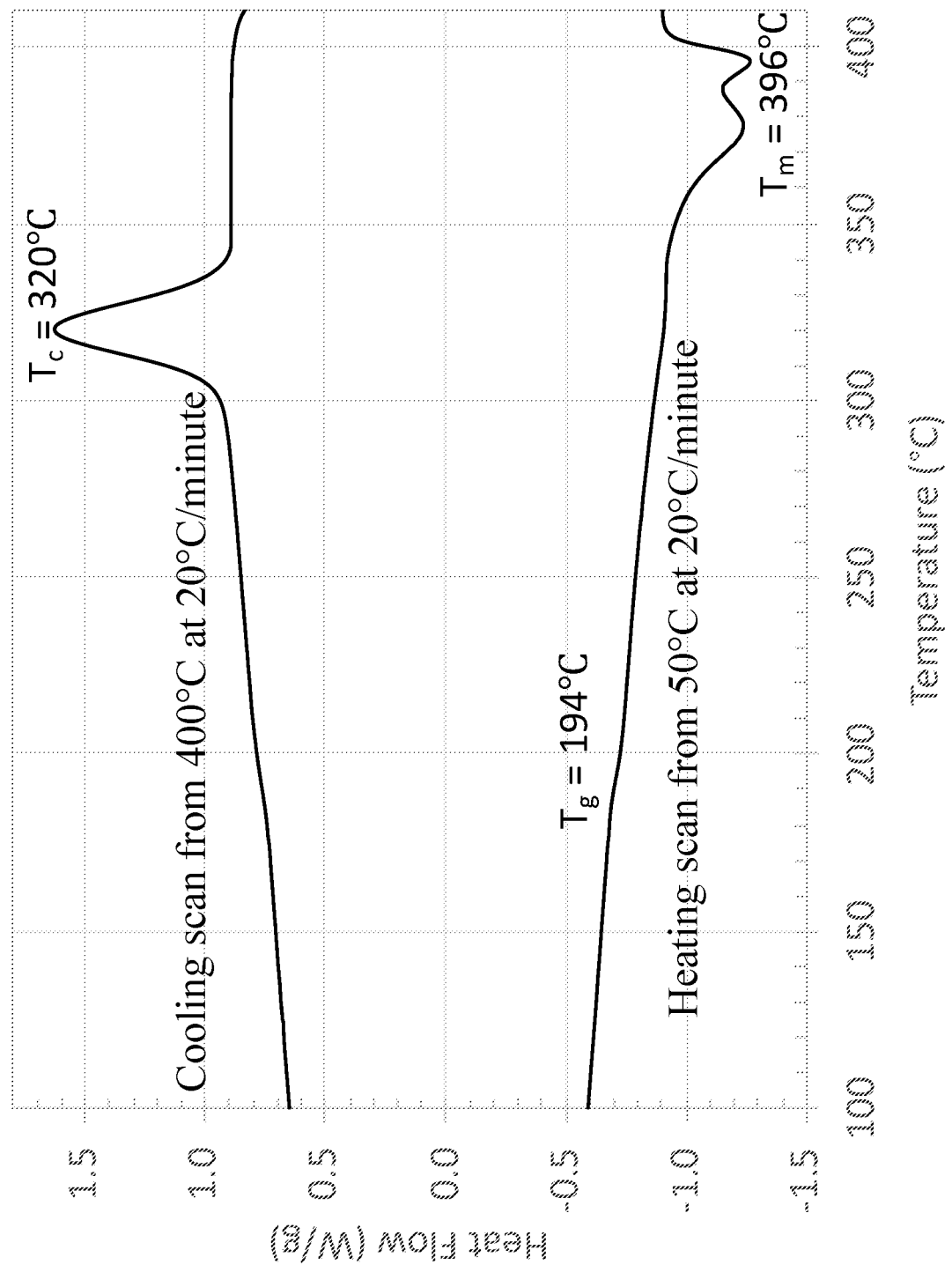
FIG. 4 is a graphical plot of DSC cooling scan (upper curve) at 20° C./minute and a heating scan (lower curve) at 20° C./minute for the PAEK copolymer of Example 4. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.70 dL/g. DSC analysis (FIG. 4) from first cooling scan from 420° C. to 50° C. at 20° C./minute showed a crystallization temperature of 320° C. with enthalpy of crystallization exotherm of 40.7 J/g, second heating scan from 50° C. to 420° C. showed a $T_g$ of 194° C., a melting temperature of 396° C. with a enthalpy of melting endotherm of 35.7 J/g, indicating that this copolymer is semicrystalline with 27.5% crystallinity.

Example 5: Preparation of PAEK Copolymer-5 27.5/72.5

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 1.28 g (9.57 mmol) of 2-benzimidazolinone, 5.29 g (38.30 mmol) of anhydrous potassium carbonate, 7.67 g (35.16 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 20 minutes and kept at 210° C. for 1 hour. During this process the reaction mixture remained as low viscosity liquid. At end of 1 hour reaction, the reaction mixture was cooled to 155° C. and 4.70 g (25.24 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 2 hours. The reaction mixture became highly viscous after 2 hours reaction. The reaction mixture was then heated from 240° C. to 260° C. in 15 minutes, during this process the viscosity of reaction mixture decreased. The reaction mixture became viscous after 1 hour reaction at 260° C. The reaction was continued for 2 hours at 260° C. At end of 2 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.5 g powder. The structure of the obtained copolymer can be sketched, in terms of repeating units, as follows:

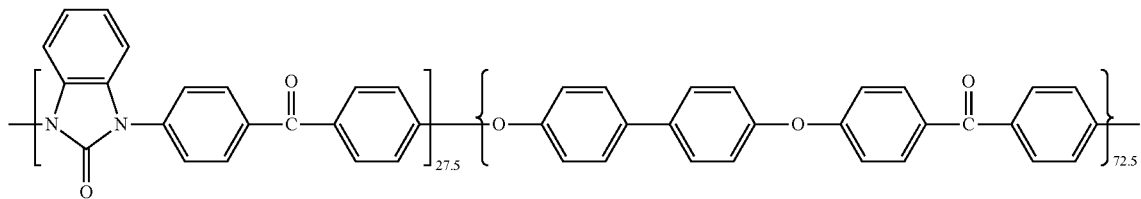

Figure 5:
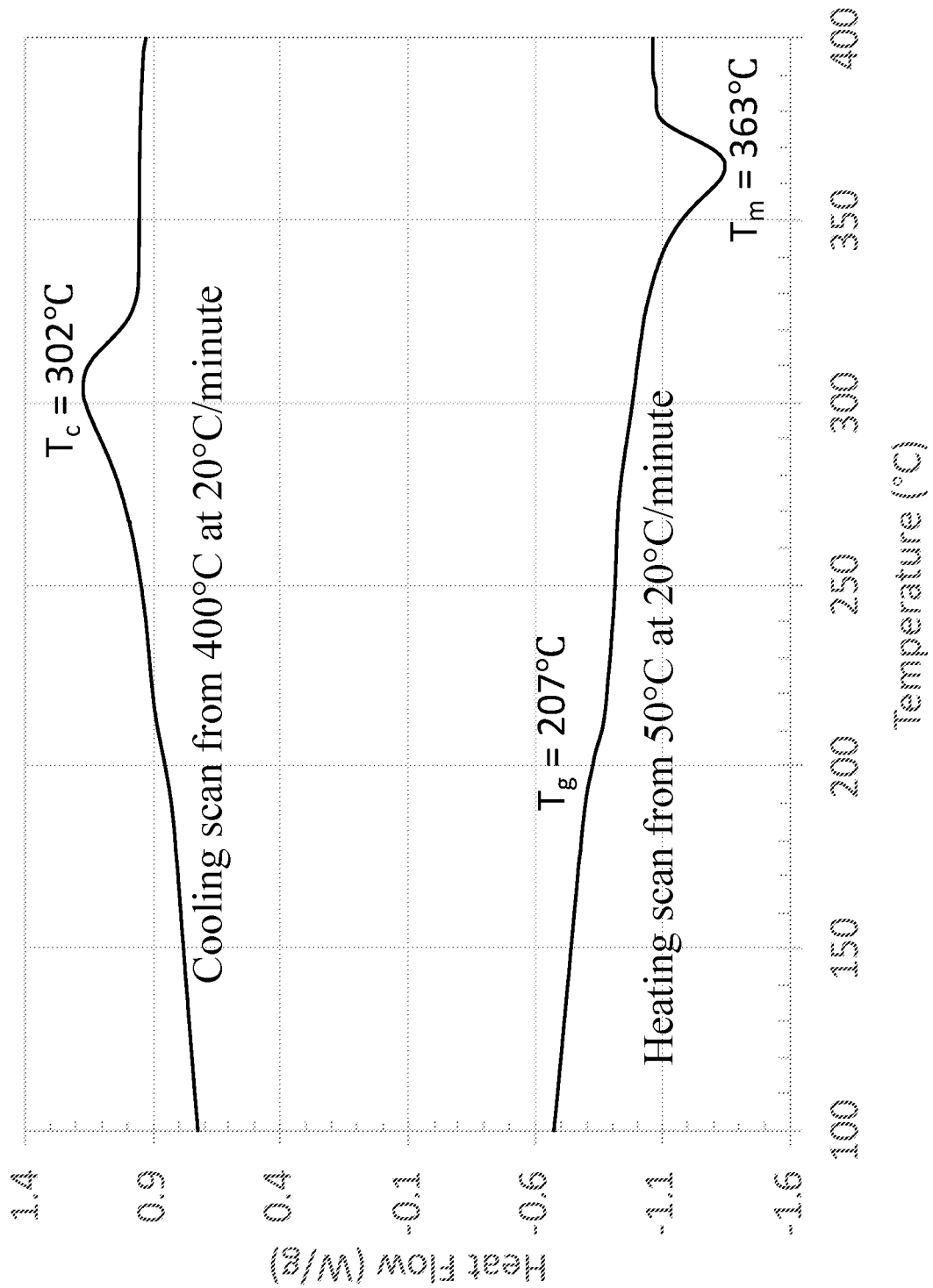
FIG. 5 is a graphical plot of DSC cooling scan (upper curve) at 20° C./minute and a heating scan (lower curve) at 20° C./minute for the PAEK copolymer of Example 5. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.95 dL/g. DSC analysis (FIG. 5) from first cooling scan from 420° C. to 50° C. at 20° C./minute showed a crystallization temperature of 302° C. with enthalpy of crystallization exotherm of 30.5 J/g, second heating scan from 50° C. to 420° C. showed a $T_g$ of 207° C., a melting temperature of 363° C. with a enthalpy of melting endotherm of 27.9 J/g, indicating that the copolymer is semicrystalline with 21.5% crystallinity.

Example 6: Preparation of PAEK Copolymer-6 10/90

In a 250 mL 3-neck reaction flask equipped with a mechanical stirrer, an argon inlet tube, a thermocouple plunging in the reaction medium, and a Dean-Stark trap with a condenser, were introduced 47.0 g of N-cyclohexyl-2-pyrrolidone (CHP), 0.40 g (2.98 mmol) of 2-benzimidazolinone, 4.54 g (32.82 mmol) of anhydrous potassium carbonate, 6.64 g (30.43 mmol) of 4,4'-difluorobenzophenone and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 20 minutes and kept at 210° C. for 1 hour. During this process the reaction mixture remained as low viscosity liquid. At end of 1 hour reaction, the reaction mixture was cooled to 155° C. and 4.70 g (25.24 mmol) of 4,4'-biphenol was added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 1 hour. The reaction mixture remained as low viscosity slurry during 1 hour reaction. The reaction mixture was then heated from 240° C. to 260° C. in 15 minutes and kept at 260° C. for 1 hour. During the 1 hour reaction, the reaction mixture remained as low viscosity slurry. The reaction mixture became viscous after 1 hour reaction at 260° C. The reaction mixture was then heated to 280° C. in 5 minutes and kept at 280° C. for 4 hours. During this process, the reaction mixture became viscous. At end of 4 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 10.4 g powder. The structure of the obtained copolymer can be sketched, in terms of repeating units, as follows:

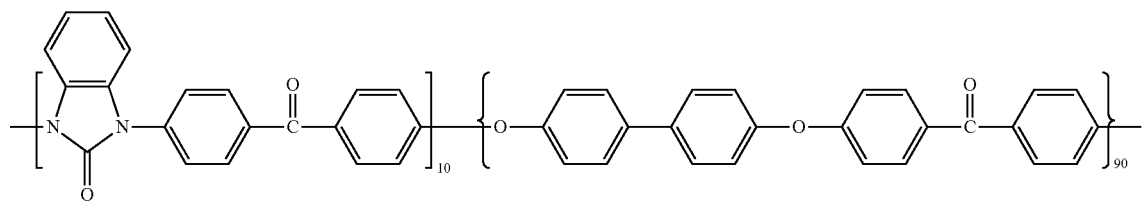

Figure 6:
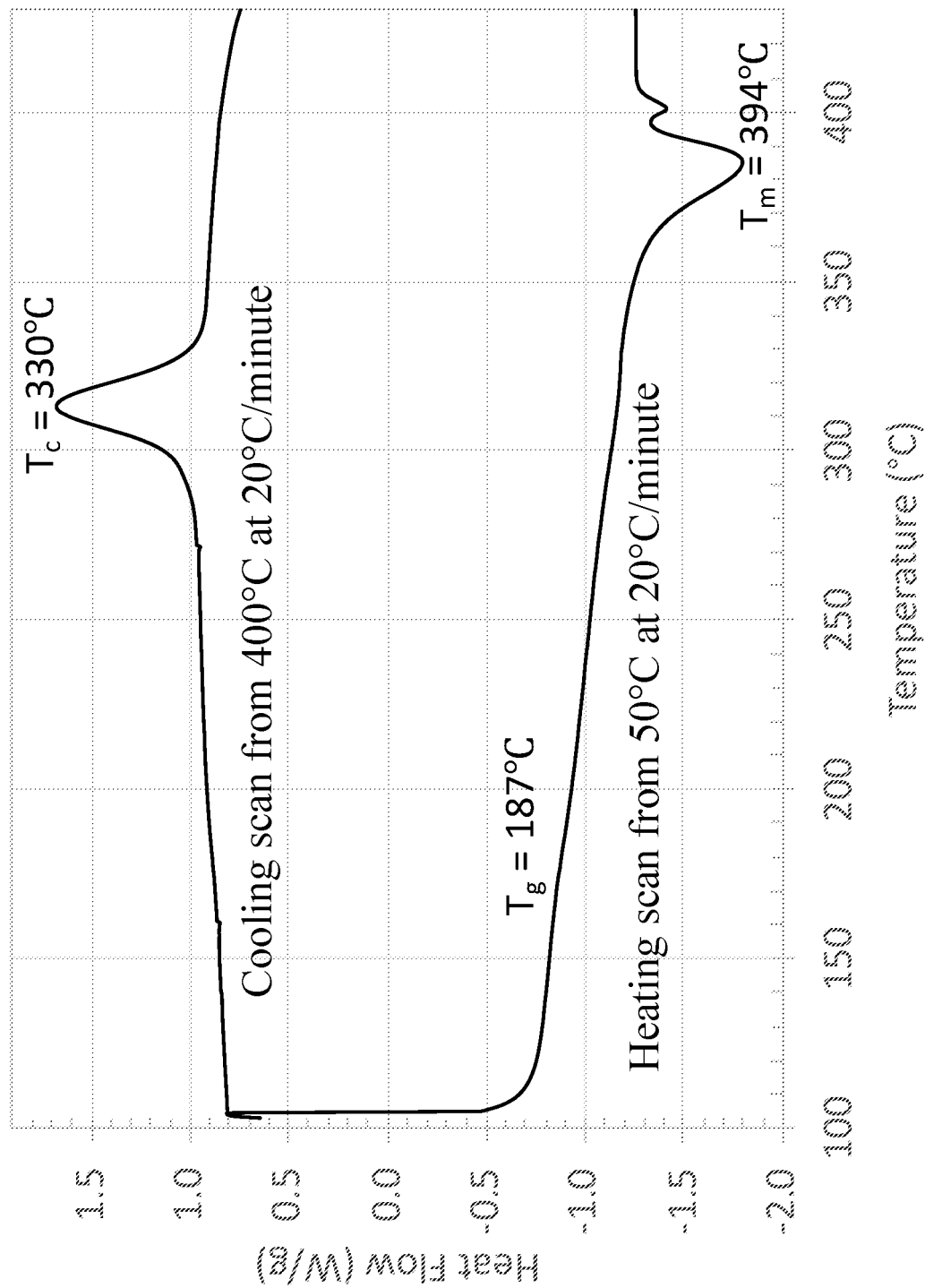
FIG. 6 is a graphical plot of DSC cooling scan (upper curve) at 20° C./minute and a heating scan curve at 20° C./minute for the PAEK copolymer of Example 6. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.55 dL/g. DSC analysis (FIG. 6) from first cooling scan from 420° C. to 50° C. at 20° C./minute showed a crystallization temperature of 330° C. with enthalpy of crystallization exotherm of 50 J/g, second heating scan from 50° C. to 420° C. showed a $T_g$ of 187° C., a melting temperature of 394° C. with a enthalpy of melting endotherm of 47 J/g, indicating that this copolymer is semicrystalline with 36.2% crystallinity.

The properties of these copolymers from Example 1 to Example 7 are summarized in Table 1.

TABLE 1

| Example | BI:BP[a] | $T_g^b$, °C. | $T_c^c$, °C. | $\Delta H_c^d$, J/g | $T_n^e$, °C. | $\Delta H_n^f$, J/g | $T_m^g$, °C. | $\Delta H_m^h$, J/g | IV[j], dL/g |
|---|---|---|---|---|---|---|---|---|---|
| Comparable Example A | 50.0:50.0 | 232 | ND[k] | ND | ND | ND | ND | ND | 0.85 |
| Comparable Example B | 35.0:65.0 | 211 | ND | ND | ND | ND | ND | ND | 0.90 |
| Example 1 | 29.0:71.0 | 199 | ND | ND | 284 | 17.9 | 366 | 16.5 | 0.95 |
| Example 2 | 25.0:75.0 | 204 | 320 | 30.0 | ND | ND | 370 | 31.0 | 0.85 |
| Example 3 | 23.0:77.0 | 200 | 327 | 35.9 | ND | ND | 375 | 25.7 | 0.80 |
| Example 4 | 20.0:80.0 | 194 | 320 | 40.7 | ND | ND | 396 | 35.7 | 0.70 |
| Example 5 | 27.5:72.5 | 207 | 302 | 30.5 | ND | ND | 363 | 27.9 | 0.95 |
| Example-6 | 10.0:90.0 | 187 | 330 | 50.0 | ND | ND | 394 | 47.0 | 0.55 |

Wherein
[a] BI is abbreviation of 2-benzimidazolinone, BP is abbreviation of 4,4'-biphenol;
[b] $T_g$ is the glass transition temperature from second heating scan;
[c] $T_c$ is the crystallization temperature from first cooling scan at cooling rate of 20° C./minute;
[d] $\Delta H_c$ is the enthalpy of crystallization exotherm peak;
[e] $T_n$ is the crystallization temperature from second heating scan at heating rate of 20° C./minute;
[f] $\Delta H_n$ is the enthalpy of crystallization exotherm peak from heating scan;
[g] $T_m$ is the peak temperature of melting endotherm from second heating scan at 20° C./minute;
[h] $\Delta H_m$ is the enthalpy of the melting endotherm peak;
[j] IV is the inherent viscosity in 0.5 wt/v % in 96% sulfuric acid at 30° C.; and
[k] ND is not detected.

Copolymers from 4,4'-biphenol and 2-benzimidazolinone with 1,4-bis(4-fluorobenzoyl)benzene Example 7: Preparation of PAEK Copolymer-7 40/60

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 1.73 g (12.89 mmol) of 2-benzimidazolinone, 1.96 g (14.18 mmol) of anhydrous potassium carbonate, 10.54 g (32.71 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 240° C. in 25 minutes and kept at 240° C. for 1 hour. During this process the reaction mixture remained as low viscosity liquid. At end of 1 hour reaction, the reaction mixture was cooled to 155° C., 3.60 g (19.33 mmol) of 4,4'-biphenol and 2.94 g (21.27 mmol) of anhydrous potassium carbonate were added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 30 minutes. The reaction mixture remained as low viscosity slurry during this process. The reaction mixture was then heated from 240° C. to 260° C. in 15 minutes and kept at 260° C. for 3 hours. After 1.5 hours reaction, the reaction mixture became viscous. The reaction mixture became highly viscous after 2.5 hours reaction at 260° C. At end of 3 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 14.2 g powder. The structure of the obtained copolymer can be sketched, in terms of repeating units, as follows:

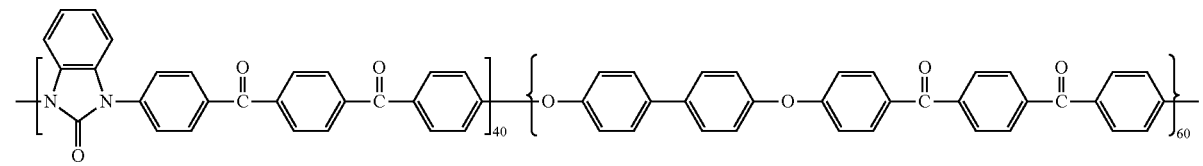

Figure 7:
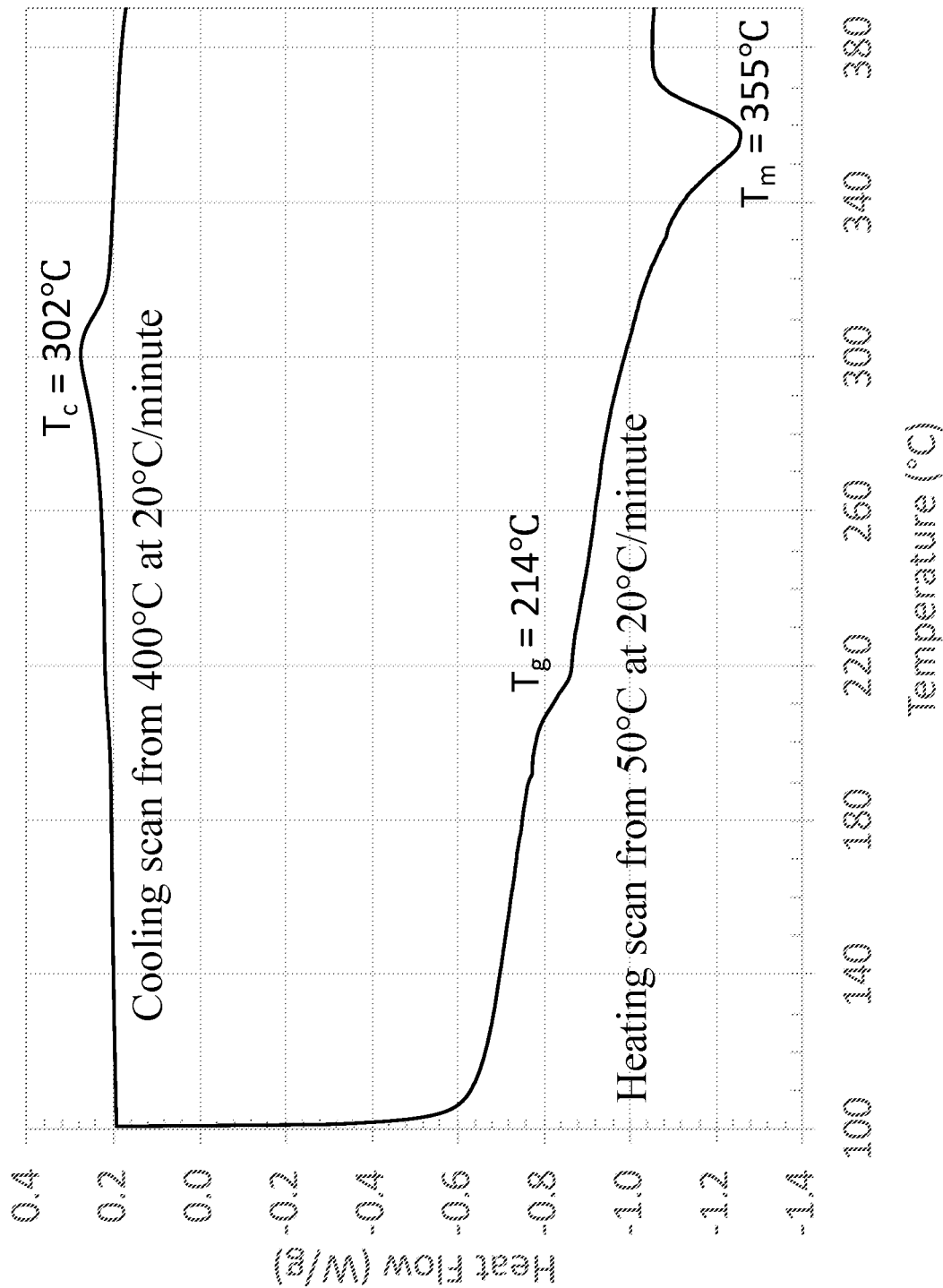
FIG. 7 is a graphical plot of DSC cooling scan (upper curve) at 20° C./minute and a heating scan (lower curve) at 20° C./minute for the PAEK copolymer of Example 7. The cooling curve shows a strong crystallization exotherm peak. The heating curve shows a glass transition and a strong melting endotherm peak.

The inherent viscosity of the copolymer, measured at 0.5 wt/vol % in 96% H$_2$SO$_4$ at 30° C., as above detailed, was found to be 0.96 dL/g. DSC analysis (FIG. 7) from first cooling scan from 420° C. to 50° C. at 20° C./minute showed a crystallization temperature of 302° C. with enthalpy of crystallization exotherm of 19.6 J/g, second heating scan from 50° C. to 400° C. showed a T$_g$ of 214° C., a melting temperature of 355° C. with a enthalpy of melting endotherm of 18.9 J/g, indicating that this copolymer is semicrystalline with 14.5% crystallinity.

Example 8: Preparation of PAEK Copolymer-8 30/70

In a 250 mL 3-neck reaction flask equipped with a mechanical stirrer, an argon inlet tube, a thermocouple

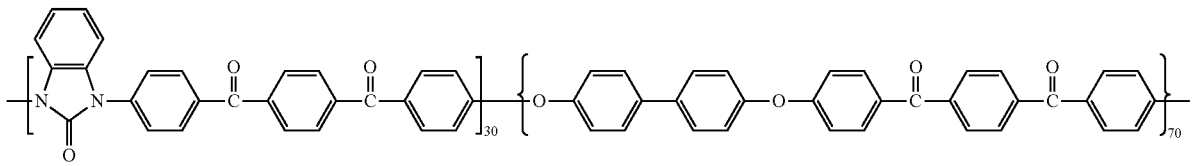

plunging in the reaction medium, and a Dean-Stark trap with a condenser, were introduced 50.0 g of N-cyclohexyl-2-pyrrolidone (CHP), 1.281 g (9.551 mmol) of 2-benzimidazolinone, 1.45 g (10.51 mmol) of anhydrous potassium carbonate, 10.364 g (32.16 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 240° C. in 25 minutes and kept at 240° C. for 1 hour. During this process the reaction mixture remained as low viscosity liquid. At end of 1 hour reaction, the reaction mixture was cooled to 155° C., 4.15 g (22.29 mmol) of 4,4'-biphenol and 3.39 g (24.52 mmol) of anhydrous potassium carbonate were added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 240° C. in 30 minutes and the polymerization was kept at 240° C. for 30 minutes. The reaction mixture became viscous slurry during this process. The reaction mixture was then heated from 240° C. to 270° C. in 20 minutes and kept at 270° C. for 5 hours. After 4 hours reaction, the reaction mixture became highly viscous. At end of 5 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Figure 8:
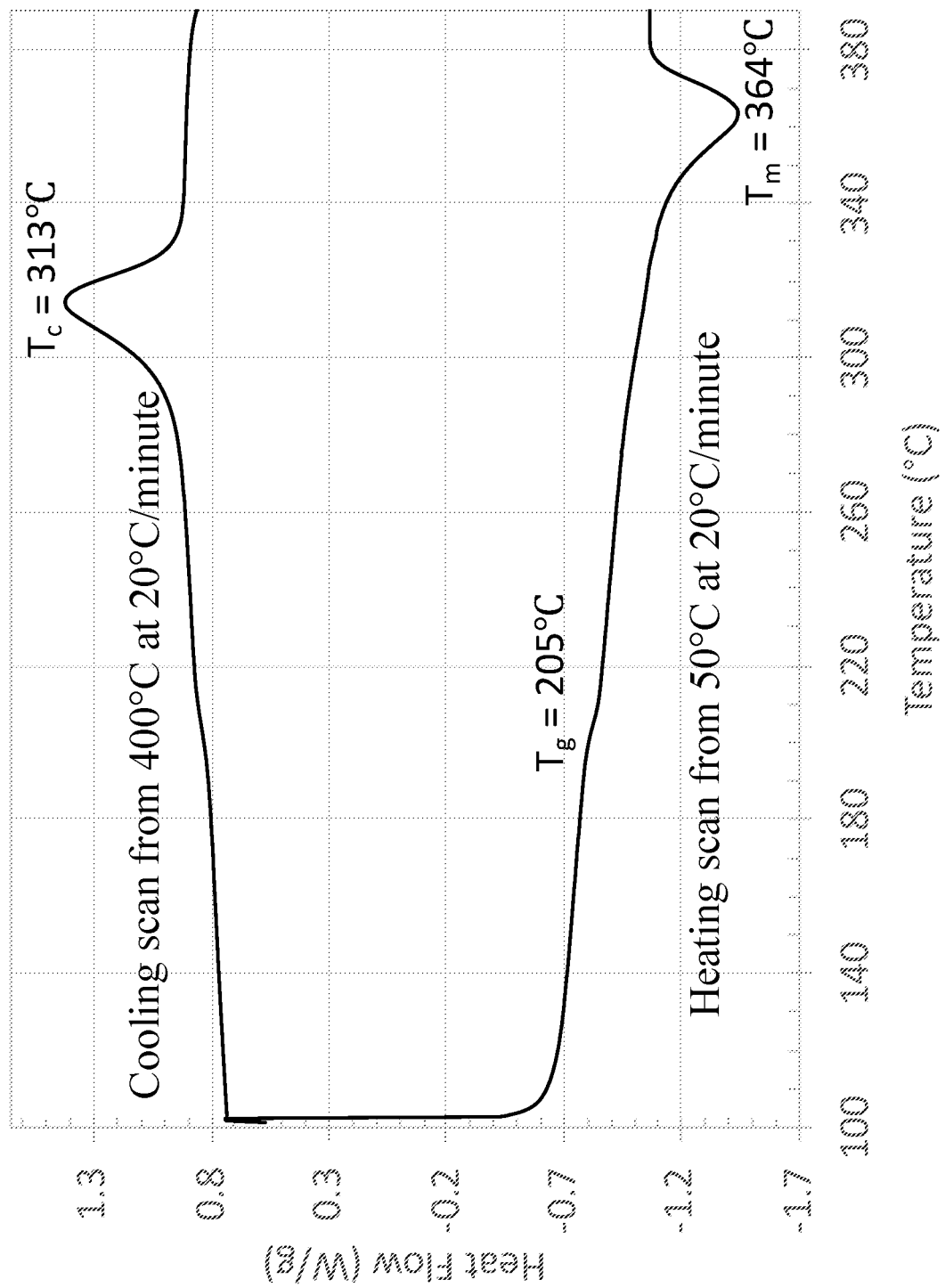
FIG. 8 is a graphical plot of DSC cooling scan (upper curve) at 20° C./minute and a heating scan (lower curve) at 20° C./minute for the PAEK copolymer of Example 8. The cooling curve shows a strong crystallization exotherm peak. The heating curve shows a glass transition and a strong melting endotherm peak.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 14.3 g powder. The structure of the obtained copolymer can be sketched, in terms of repeating units, as follows:

The inherent viscosity of the copolymer, measured at 0.5 wt/vol % in 96% H$_2$SO$_4$ at 30° C., as above detailed, was found to be 1.05 dL/g. DSC analysis (FIG. 8) from first cooling scan from 420° C. to 50° C. at 20° C./minute showed a crystallization temperature of 314° C. with enthalpy of crystallization exotherm of 33.5 J/g, second heating scan from 50° C. to 400° C. showed a T$_g$ of 205° C., a melting temperature of 364° C. with a enthalpy of melting endotherm of 24.4 J/g, indicating that this copolymer is semicrystalline with 18.8% crystallinity.

Example 9: Preparation of PAEK Copolymer-9 25/75

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 0.94 g (6.98 mmol) of 2-benzimidazolinone, 1.061 g (6.14 mmol) of anhydrous potassium carbonate, 9.09 g (28.21 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 210° C. in 15 minutes and kept at 210° C. for 1 hour. During this process the reaction mixture remained as low viscosity liquid. At end of 1 hour reaction, the reaction mixture was cooled to 155° C., 3.90 g (20.94 mmol) of 4,4'-biphenol and 3.18 g (23.04 mmol) of anhydrous potassium carbonate were added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 260° C. in 30 minutes and the polymerization was kept at 260° C. for 30 minutes. The reaction mixture became low viscosity slurry during this process. The reaction mixture was then heated from 260° C. to 283° C. in 15 minutes and kept at 283° C. for 3 hours. During this process the reaction mixture became viscous. At end of 3 hours reaction, the viscous reaction mixture was cooled to less than 100° C. 150 ml de-ionized water was added to the reaction mixture once temperature was less than 100° C. and the mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 12.5 g powder. The structure of the obtained copolymer can be sketched, in terms of repeating units, as follows:

none, 0.56 g (4.07 mmol) of anhydrous potassium carbonate, 8.02 g (24.89 mmol) of 1,4-bis(4-fluorobenzoyl)benzene and 20 ml xylene. The flask content was evacuated under vacuum and then filled with high purity argon. The reaction mixture was then placed under a constant argon purge (40 mL/min).

The reaction mixture was heated slowly to 155° C. and kept at 155° C. for 30 minutes. The reaction mixture was then heated to 175° C. and kept at 175° C. for 60 minutes. During this process xylene along with water were distilled and collected in Dean-Stark trap and removed. The reaction mixture was then heated to 230° C. in 25 minutes and kept at 230° C. for 1 hour. During this process the reaction mixture remained as low viscosity liquid. At end of 1 hour reaction, the reaction mixture was cooled to 155° C., 3.90 g (20.94 mmol) of 4,4'-biphenol and 3.18 g (23.04 mmol) of anhydrous potassium carbonate were added along with 20 ml xylene. The reaction mixture was kept at 155° C. for 30 minutes and then heated to 175° C. The reaction mixture was kept at 175° C. for 1.5 hours, and during this process, xylene along with water was distilled and collected in Dean-Stark trap and removed. The reaction mixture was then heated from 175° C. to 260° C. in 30 minutes and the polymerization was kept at 260° C. for 30 minutes. The reaction mixture became low viscosity slurry during this process. The reaction mixture was then heated from 260° C. to 283° C. in 15 minutes and kept at 283° C. for 6 hours. During this process the reaction mixture became viscous. At end of 6 hours reaction, the viscous reaction mixture was cooled to less than 100° C. 150 ml de-ionized water was added to the reaction mixture once temperature was less than 100° C. and

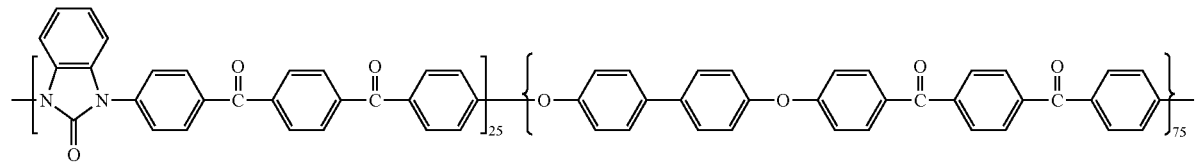

The inherent viscosity of the copolymer, measured at 0.5 wt/vol % in 96% $H_2SO_4$ at 30° C., as above detailed, was found to be 0.60 dL/g. DSC analysis from first cooling scan from 420° C. to 50° C. at 20° C./minute showed a crystallization temperature of 327° C. with enthalpy of crystallization exotherm of 37.1 J/g, second heating scan from 50° C. to 400° C. showed a $T_g$ of 201° C., a melting temperature of 376° C. with a enthalpy of melting endotherm of 35.4 J/g, indicating that this copolymer is semicrystalline with 27.2% crystallinity.

Example 10: Preparation of PAEK Copolymer-10 15/85

In a 250 mL 3-neck reaction flask equipped with a mechanical stirrer, an argon inlet tube, a thermocouple plunging in the reaction medium, and a Dean-Stark trap with a condenser, were introduced 50.0 g of N-cyclohexyl-2-pyrrolidone (CHP), 0.50 g (3.70 mmol) of 2-benzimidazolithe mixture was transferred to a Waring blender. It was mixed for 3 minutes and filtered. The filtered liquid was collected for solvent recovery. The filtered solid was blended with another 75 ml de-ionized water for 3 minutes in a Waring blender and filtered to recover any residual solvent. The filtered liquid was combined with previous filtered liquid for solvent recovery.

Filtered solid was transferred to a Waring blender along with 300 ml de-ionized water. It was blended for 3 minutes and filtered. The ion conductivity of filtered liquid was tested, and the process was repeated until the ion conductivity of the filtered liquid was less than 10. The solid was then transferred to a 250 ml flask along with 150 ml de-ionized water. The mixture was stirred overnight under gentle reflux. It was then filtered hot. The ion conductivity of the filtered liquid was tested, and the process was repeated until the ion conductivity of the filtered liquid was less than 3. The filtered powder was then dried at 160° C. under vacuum for 12 hours yielding 11.1 g powder. The structure of the obtained copolymer can be sketched, in terms of repeating units, as follows:

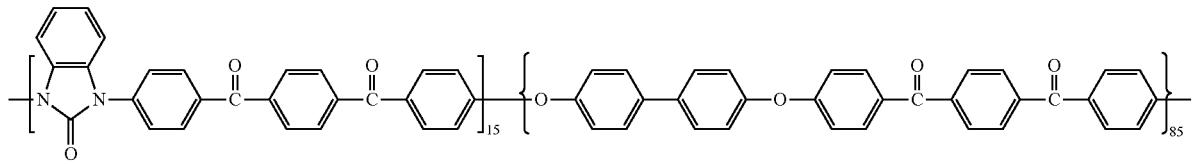

Figure 9:
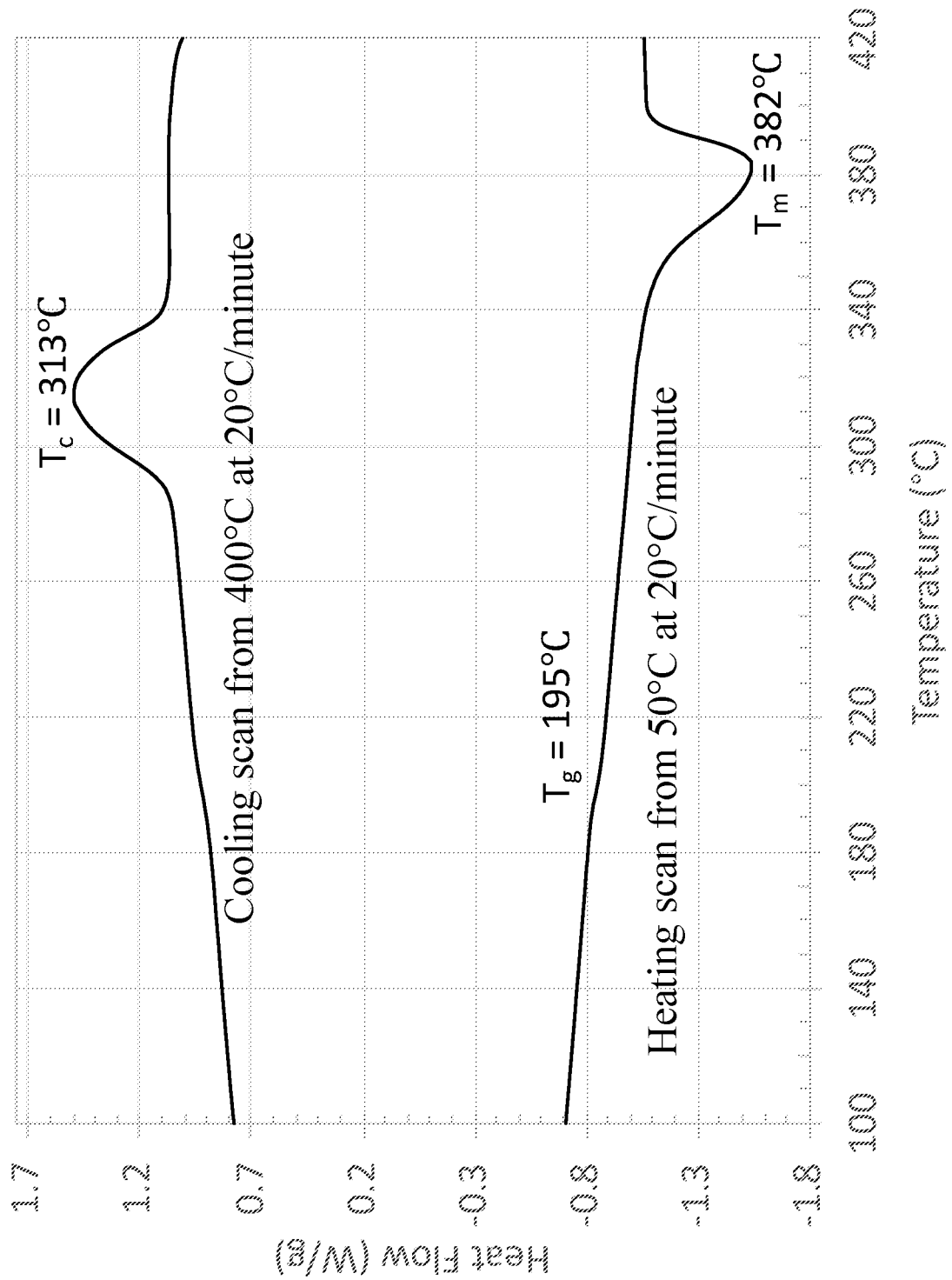
FIG. 9 is a graphical plot of DSC cooling scan (upper curve) at 20° C./minute and a heating scan (lower curve) at 20° C./minute for the PAEK copolymer of Example 10. The cooling curve shows a strong crystallization exotherm peak. The heating curve shows a glass transition and a strong melting endotherm peak.

The inherent viscosity of the copolymer, measured at 0.5 wt/vol % in 96% $H_2SO_4$ at 30° C., as above detailed, was found to be 0.58 dL/g. DSC analysis (FIG. 9) from first cooling scan from 420° C. to 50° C. at 20° C./minute showed a crystallization temperature of 313° C. with enthalpy of crystallization exotherm of 45.2 J/g, second heating scan from 50° C. to 420° C. showed a $T_g$ of 195° C., a melting temperature of 382° C. with a enthalpy of melting endotherm of 40.3 J/g, indicating that this copolymer is semicrystalline with 31.0% crystallinity.

The properties of these copolymers from Example 7 to Example 10 are summarized in Table 2.

TABLE 2

| Example | BI:BP:BFBB [a] | $T_g$ [b], ° C. | $T_c$ [c], ° C. | $\Delta H_c$ [d], J/g | $T_m$ [e], ° C. | $\Delta H_m$ [f], J/g | IV [g], dL/g |
|---|---|---|---|---|---|---|---|
| Example 7 | 40.0:60.0:101.5 | 214 | 302 | 19.6 | 355 | 18.9 | 0.96 |
| Example 8 | 30.0:70.0:101.0 | 205 | 314 | 33.5 | 364 | 24.4 | 1.05 |
| Example 9 | 25.0:75.0:101.0 | 201 | 327 | 37.1 | 376 | 35.4 | 0.60 |
| Example 10 | 15.0:85.0:101.0 | 195 | 313 | 45.2 | 382 | 40.3 | 0.58 |

Wherein
[a] BI is abbreviation of 2-benzimidazolinone, BP is abbreviation of 4,4'-biphenyl, BFBB is abbreviation bis(4-fluorobenzoyl)benzene;
[b] $T_g$ is the glass transition temperature from second heating scan;
[c] $T_c$ is the crystallization temperature from first cooling scan at cooling rate of 20° C./minute;
[d] $\Delta H_c$ is the enthalpy of crystallization exotherm peak;
[e] $T_m$ is the peak temperature of melting endotherm from second heating scan at 20° C./minute;
[f] $\Delta H_m$ is the enthalpy of the melting endotherm peak; and
[g] IV is the inherent viscosity in 0.5 wt/v % in 96% sulfuric acid at 30° C.

It will be appreciated that the PAEK copolymer described in the Examples have high glass transition temperatures, high melting temperatures and high levels of crystallinity. They may therefore be advantageously used for production of components and devices that can be used in high temperature and high pressure environment such as oil and gas exploration and production.

The invention is not restricted to the details of the foregoing embodiment(s). The invention extends to any combination, of the features disclosed in this specification (including any accompanying claims, abstract and drawings), or to any one specific embodiment, or any of several various possible combinations, of the steps of any method or process so disclosed.

The foregoing examples are merely illustrative of the invention, serving to illustrate only some of the features of the present invention. The appended claims are intended to claim the invention as broadly as it has been conceived and the examples herein presented are illustrative of selected embodiments from a manifold of all possible embodiments, suggesting or implying other embodiments of the chemistry described herein. Accordingly it is Applicant's intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All United States patents (and patent applications) referenced herein are herewith and hereby specifically incorporated by reference in their entirety as though set forth in full.

Other than in the working examples or where otherwise indicated, all numbers expressing amounts of materials, reaction conditions, time durations, quantified properties of materials, and so forth, stated in the specification are to be understood as being modified in all instances by the term "about."

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The invention claimed is:

1. A polymeric composition comprising a copolymer having two separate recurring units, a first recurring unit having the formula, formula III:

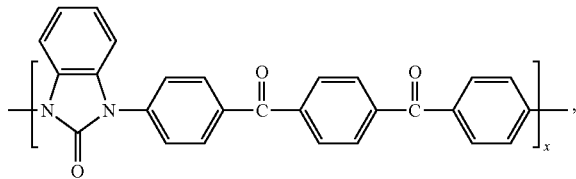

and a second recurring unit having the formula, formula IV:

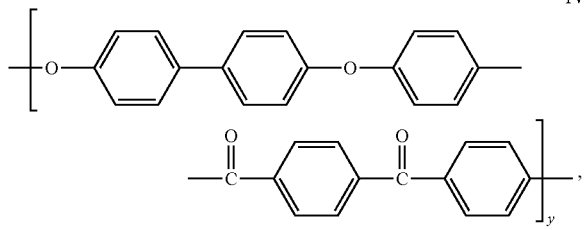

wherein the value of the subscript x ranges from 1 to 5000, subject to the limitation that the value of the subscript y ranges from 1 to 5000, the ratio of x:y ranges from 1:99 to 99:1, wherein said polymeric composition has an inherent solution viscosity greater than 0.3 dL/g.

2. The composition according to claim 1, wherein the inherent solution viscosity of said copolymer is at least 0.5 dL/g and is less than 3.0 dL/g.

3. A composition according to claim 1, wherein the ratio of x:y ranges from 1:99 to 45:55, and wherein said polymeric composition is semicrystalline having an inherent solution viscosity greater than 0.3 dL/g, a $T_g$ greater than 190° C., a $T_c$ less than 340° C., a $T_m$ less than 400° C., and an enthalpy of melting endotherm ($\Delta H_m$) greater than 10 J/g and less than 55 J/g, wherein said semicrystalline copolymer crystallizes from a melt at a cooling rate of from 5° C./minute to about 200° C./minute.

4. The composition according to claim 3, wherein said semicrystalline copolymer has a $T_g$ from about 190° C. to about 230° C., a $T_m$ from about 330° C. to about 395° C., a $T_c$ from about 250° C. to about 340° C., and an enthalpy of melting endotherm ($\Delta H_m$) from about 10 J/g to about 55 J/g.

5. The composition according to claim 4, wherein the $T_m$ is greater than the $T_g$ by about 145° C. to about 195° C.

6. A composition according to claim 1, additionally comprising a polymer selected from the group consisting of polybenzimidazole, polyarylamides, polysulfones, polyketones, polyimides, polyetherimides, polyphenylenesulfides, fluoropolymers, polyamides, polyesters, polycarbonates and mixtures thereof.

7. The composition of claim 1, further comprising a filler selected from the group consisting of fibrous fillers and non-fibrous fillers.

8. A material according to claim 7, wherein the weight percent of filler ranges from 10 weight percent to 80 weight percent.

9. A material according to claim 8, wherein said filler is selected from the group consisting of glass fiber, carbon fiber, carbon black, graphite, graphene, a fluorocarbon resin, and mixtures thereof.

10. A composition comprising the composition of claim 1, comprising at least one reinforcing filler and one or more additional ingredient(s), selected from the group consisting of colorants, pigments, light stabilizers, heat stabilizers, antioxidants, acid scavengers, processing aids, nucleating agents, lubricants, flame retardants, smoke-suppressing agents, anti-static agents, anti-blocking agents, conductivity additives, plasticizers, flow modifiers, extenders, metal deactivators and mixtures thereof.

11. An article of manufacture comprising the polymeric composition of claim 1.

12. A method of making a semicrystalline copolymer according to claim 1, comprising reacting at least one dihalo-derivative of the formula, formula V:

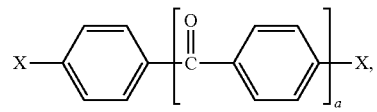

with a mixture of compound of the formula, formula VI

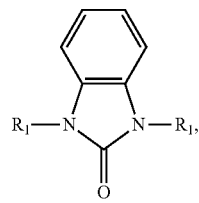

and compound of the formula, formula VII

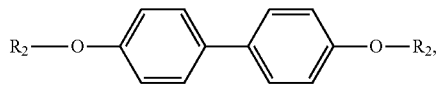

in a hydrophilic organic solvent in the presence of an alkali metal carbonate or a mixture of alkali metal carbonate from 140 to 290° C.; wherein a is 2, in a molar ratio (VI:VII) of 1:99 to 99:1, each X is selected from a chlorine and fluorine atom, R1 is selected from an alkali metal and a hydrogen atom and R2 is selected from an alkali metal and a hydrogen atom.

* * * * *